United States Patent
Castagna et al.

(10) Patent No.: US 6,400,732 B1
(45) Date of Patent: Jun. 4, 2002

(54) METHOD AND APPARATUS FOR TRANSMITTING DATA IN A HIGH-SPEED, MULTIPLEXED DATA COMMUNICATION SYSTEM

(75) Inventors: Peter J. Castagna, Renton; David Randall, Bremerton, both of WA (US)

(73) Assignee: DMC Stratex Networks, Inc., San Jose, CA (US)

( * ) Notice: Subject to any disclaimer, the term of this patent is extended or adjusted under 35 U.S.C. 154(b) by 0 days.

(21) Appl. No.: 09/384,038

(22) Filed: Aug. 26, 1999

Related U.S. Application Data

(63) Continuation of application No. 08/896,610, filed on Jul. 18, 1997, now Pat. No. 6,011,807.

(51) Int. Cl.[7] .................................................. H04J 3/07
(52) U.S. Cl. ........................ 370/506; 370/509; 375/368
(58) Field of Search ................................ 370/503, 506, 370/509, 510, 511, 512, 513, 514; 375/363, 368, 365, 366, 364, 343

(56) References Cited

U.S. PATENT DOCUMENTS

| | | | | |
|---|---|---|---|---|
| 3,873,920 A | * | 3/1975 | Apple, Jr. et al. | 714/775 |
| 4,686,690 A | * | 8/1987 | Bato | 375/365 |
| 4,930,125 A | * | 5/1990 | Bains | 370/510 |
| 5,107,495 A | * | 4/1992 | Kamoi et al. | 370/510 |
| 5,337,334 A | * | 8/1994 | Molloy | 375/372 |

* cited by examiner

Primary Examiner—David R. Vincent
Assistant Examiner—Bob A. Phunkulh
(74) Attorney, Agent, or Firm—Skjerven Morrill MacPherson LLP; Edward C. Kwok

(57) ABSTRACT

A method and apparatus for determining synchronization and loss of synchronization in a high speed multiplexed data system. The system also includes a plurality of justification control bits and a backwards compatibility flag that allows the system to operate with older systems that have fewer justification control bits.

10 Claims, 31 Drawing Sheets

Detection of Synch Loss

Super Frame

| | Synch Sequence | Slipped By 1 | Bit Error |
|---|---|---|---|
| 0 | 1 | 1 | |
| 1 | 0 | 1 | X |
| 2 | 0 | 0 | |
| 3 | 1 | 0 | X |
| 4 | 1 | 1 | |
| 5 | 0 | 1 | X |
| 6 | 0 | 0 | |
| 7 | 1 | 0 | X |
| 8 | 1 | 1 | |
| 9 | 0 | 1 | X |
| 10 | 0 | 0 | |
| 11 | 0 | 0 | |
| 12 | 0 | 0 | |
| 13 | 1 | 0 | X |
| 14 | 1 | 1 | |
| 15 | 1 | 1 | |

502    504    506    6 = Total # Bit Errors

Fig. 5

| Number of Bit Slips | Number of Bit Errors |
|---|---|
| 0 | 0 |
| 1 | 6 |
| 2 | 12 |
| 3 | 10 |
| 4 | 8 |
| 5 | 8 |
| 6 | 8 |
| 7 | 8 |
| 8 | 8 |
| 9 | 8 |
| 0 | 8 |
| 11 | 8 |
| 12 | 8 |
| 13 | 10 |
| 14 | 12 |
| 15 | 6 |

Fig. 6

Detection of Synch Loss

Reestablish Synch Lock add counter reset by 5fb [3. 0]=1111
   count=muxddly.ne.sfbo but only on scrfrm1
   tme=count>=6 resets counter also
SF_ER MUST BE LOW FOR AT LEAST 1 FRAME TO PROPERLY RESET ERROR COUNTER

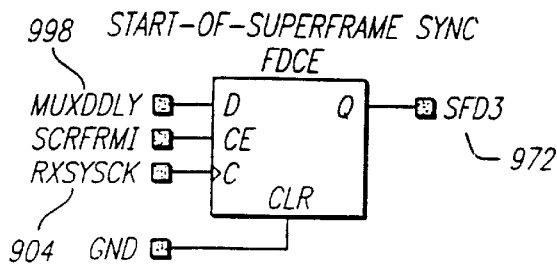
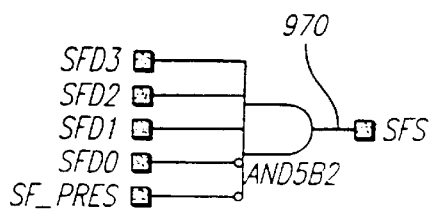
FIG. 9(h)
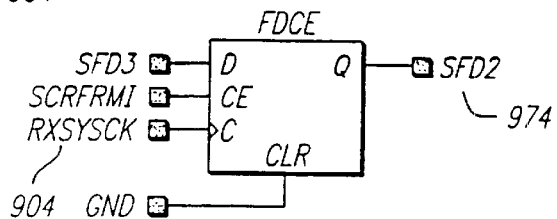
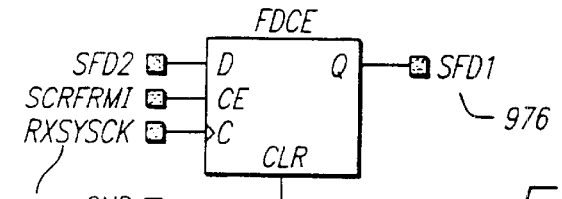
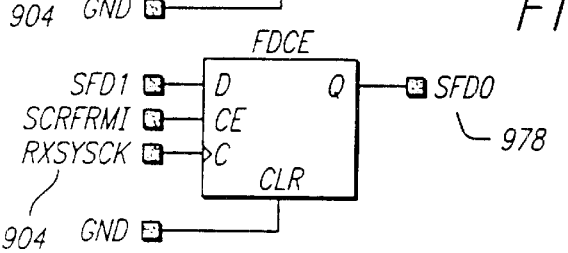
FIG. 9(g)
FIG. 9(i)
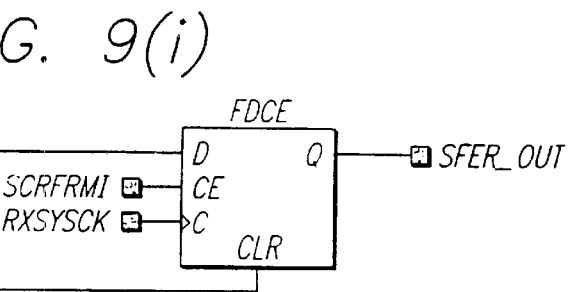
FIG. 9(j)
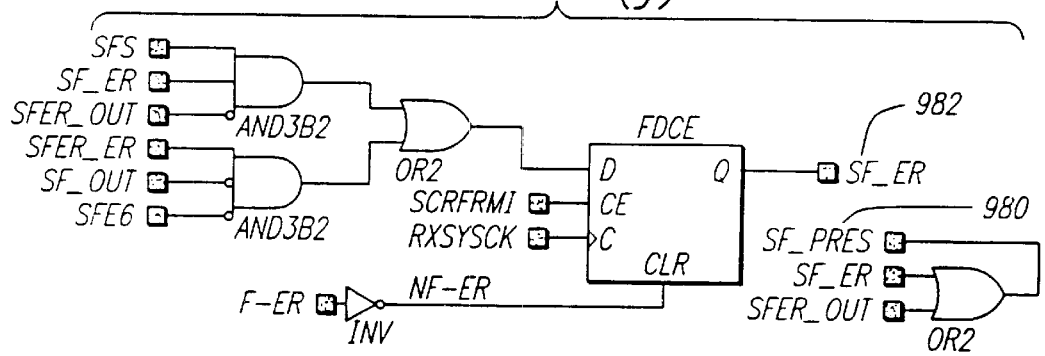

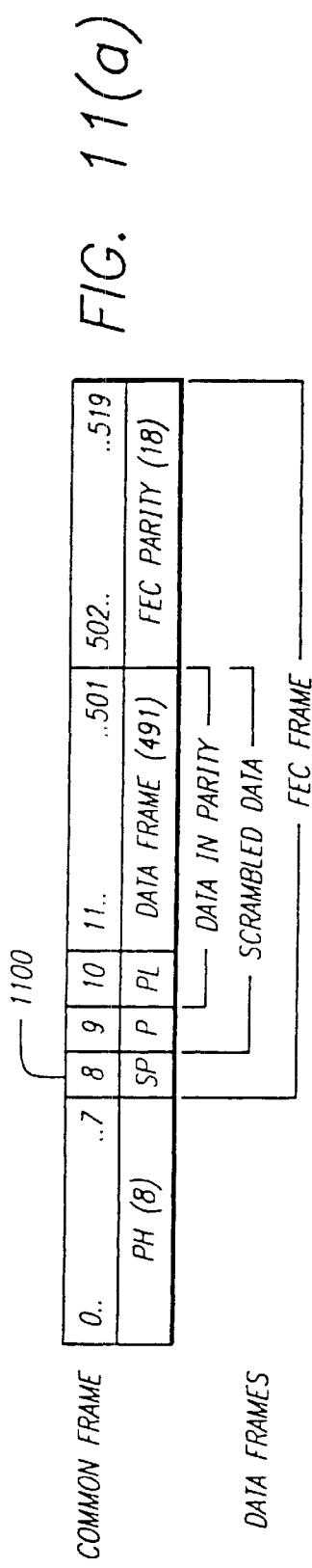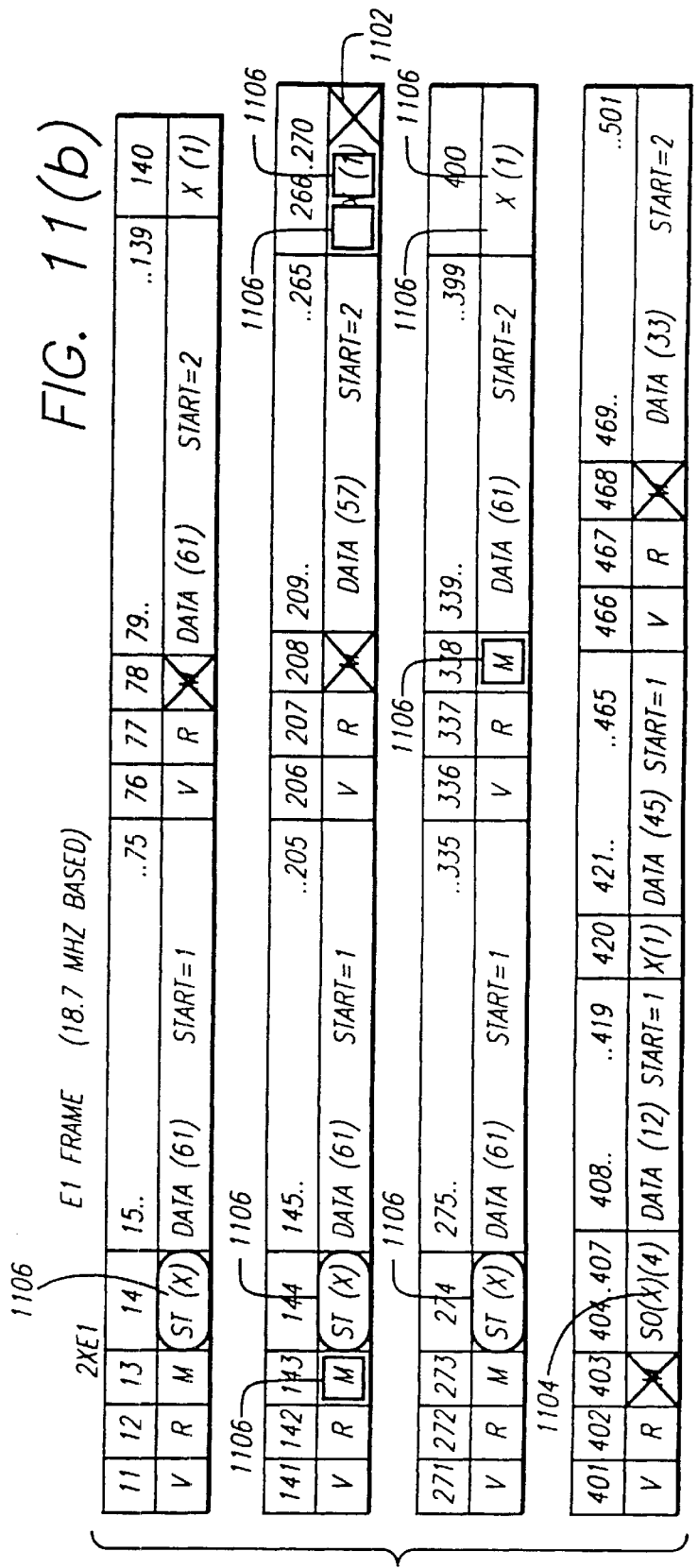

LEGEND:

FH : FRAME HEADER ; 8 BIT FIXED PATTERN (B4 HEX), NOT INCLUDED IN FEC, NOT SCRAMBLED.
SF : SCRAMBLER FRAME ; 16 BIT REPEATING PATTERN USED TO SYNCHRONIZE THE DESCRAMBLER AND ALIGN THE SUPER FRAME (USED FOR FLAG BITS AND 4XT1 STUFFING INFO). NOT SCRAMBLED.
    PATTERN : 1 0 0 1 1 0 0 1 1 0 0 0 0 1 1 1
P  : PARITY ; EVEN/ODD PARITY VALUE OF THE PREVIOUS DATA FRAME.
FL : FLAG BITS ; FOUR SIGNALING BITS IN ROTATION - 0 1 2 3 0 1 2 3 0 1 2 3 0 1 2 3
FEC: 18 BIT PARITY VALUE OF CURRENT FRAME, USED FOR FORWARD ERROR CORRECTION.

* FOR 4X AND 2X, THE ST AND SO BITS RELATE TO A SINGLE TRIBUTARY PER FRAME, WITHIN THE SUPER FRAME.
  TRIBUTARY ROTATION : 1 2 3 4 1 2 3 4 1 2 3 4 1 2 3 4 (FOR 2X : 1 2 1 2 1 2 ...)
  THE SO(X) BLOCK OF BITS ONLY APPLIES TO THE BITS OF THE TRIBUTARY THAT IS RELATED TO THAT FRAME. FOR EXAMPLE SO(X)=8 IN A 4X SYSTEM ONLY APPLIES TO TWO BITS PER FRAME.
  IN EACH DATA BLOCK, THE TRIBUTARY NUMBER FOR THE FIRST BIT IN THAT BLOCK IS INDICATED AS "START"

R  : RS232 ; DATA BIT FOR O4TA ORDERWIRE CHANNEL.
     RATE : 72.018 KB/S@ 2XE1/4XE1/4XE1C/8XE1C, 69.706 KB/S @ 4XT1, 41.827 KB/S @ 4XT1C, 83.654 KB/S @ 8XT1C
V  : VOICE ; DATA BIT FOR VOICE ORDERWIRE CHANNEL.
     RATE : 72.018 KB/:@ 2XE1/4XE1/4XE1C/8XE1C, 69.706 KB/S @ 4XT1C, 83.654 KB/S @ 8XT1C
M  : MICRO ; DATA BIT FOR SIU TO SIU COMMUNICATION LINK.
     RATE : VARIES ON DEMAND FROM 0 KB/S TO 144.036 KB/S
D  : TRIBUTARY DATA ; FOR 2XE1 AND 4XTS, DATA IS INTERLEAVED SEQUENTIALLY, STARTING WITH TRIB. 1.
     FOR 4XE1, DATA IS MUXED SEPARATELY INTO A STANDARD E2 FRAME AND THEN INSERTED.
ST : STUFFING CONTROL : USED TO IDENTIFY USAGE OF SO BITS, FOR MATCHING BIT RATES.
SO : STUFFING OPPORTUNITY USED TO INCREASE OR DECREASE THE BIT RATE OF THE TRIBUTARY DATA, TO MATCH EXTERNAL FREQUENCIES.
X  : EXTRA BITS : USAGE NOT DETERMINED.

FIG. 11(f)

○ = ST3 (3 BITS) FLAG

□ = ST7 (7 BITS) FLAG

∗ = 7 BIT FLAG (INDICATOR)

× = UN/USED

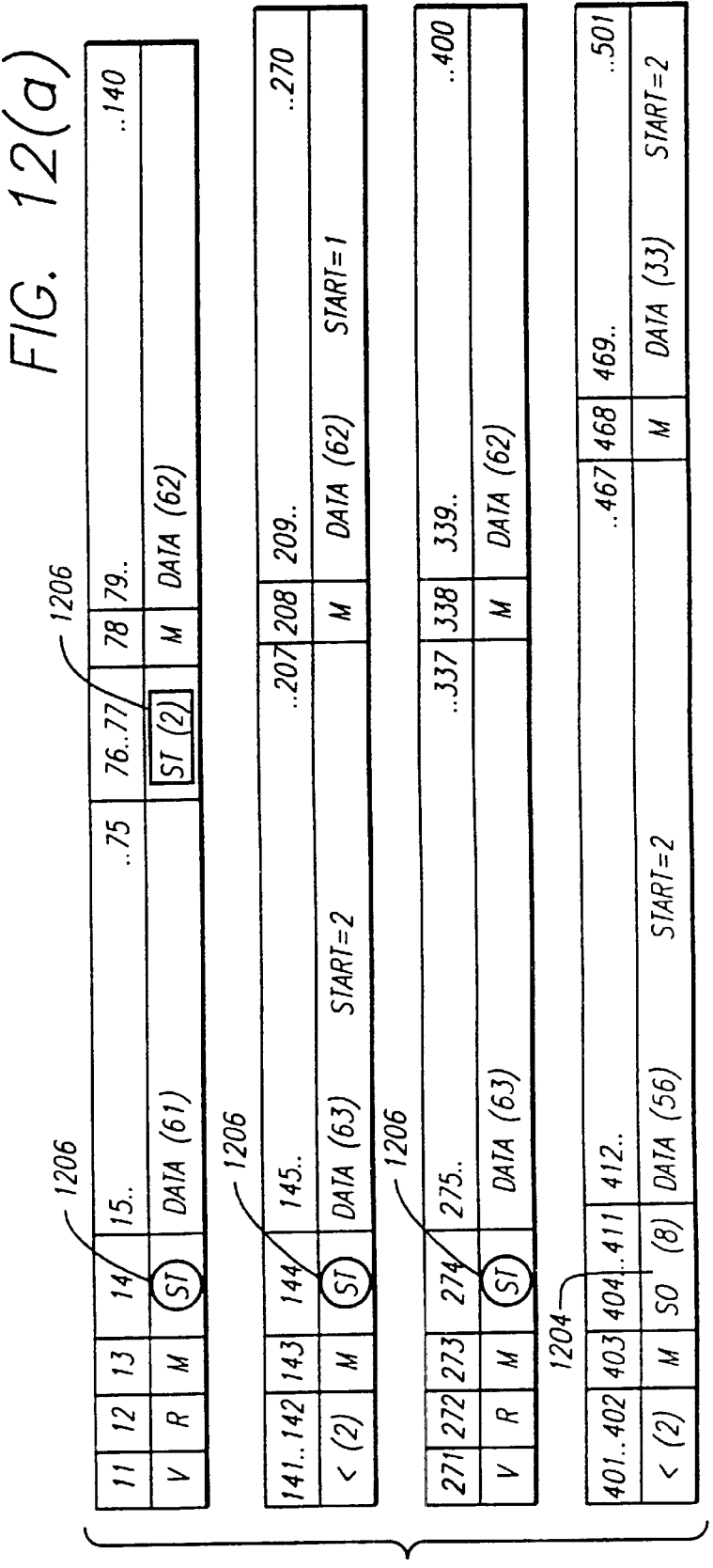

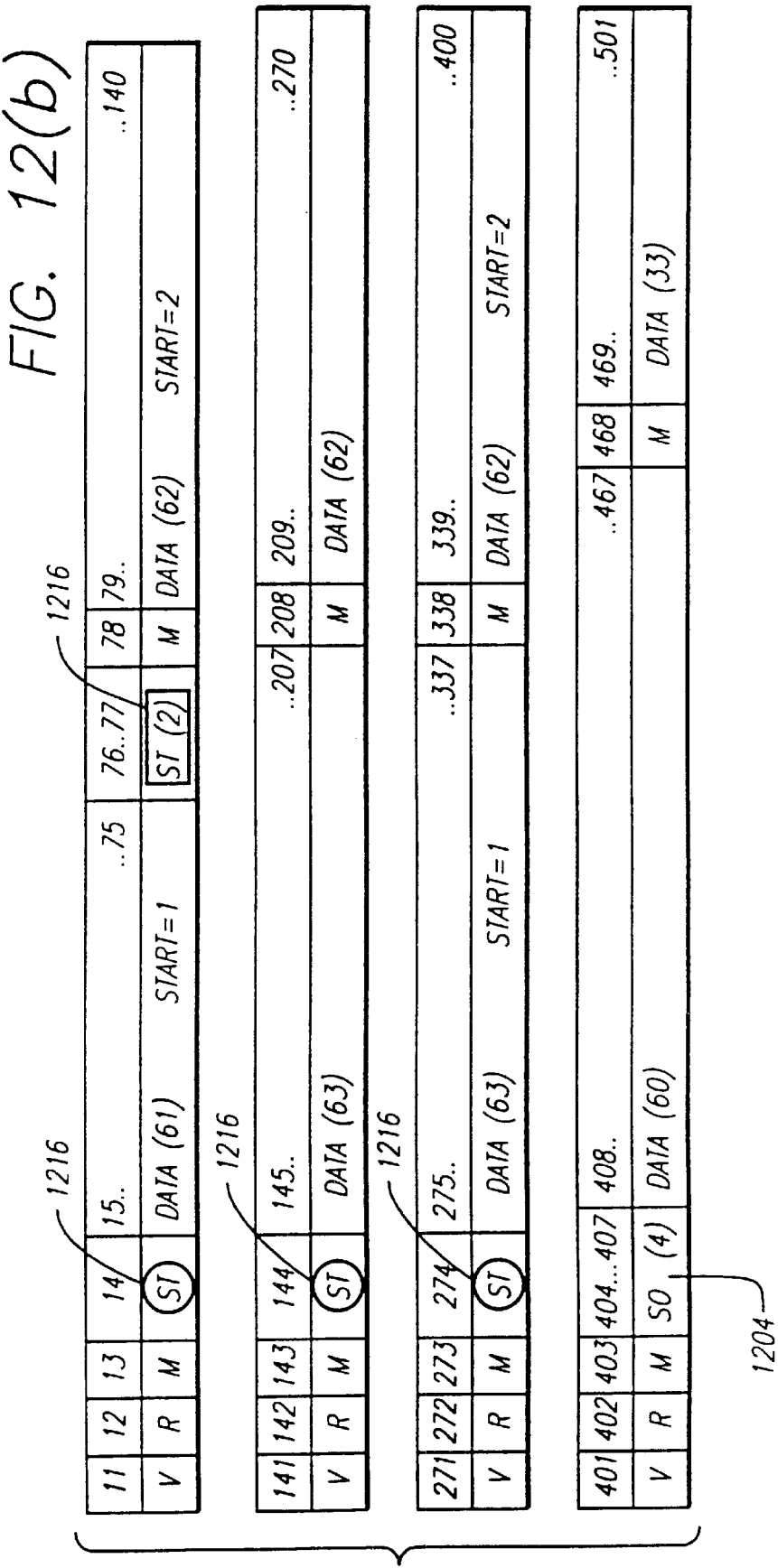

STUFF SIZE COUNTER
FLAG BIT COUNTER

STUFF=0 COUNTER

STUFF ENABLE
DECODER
(for /3 stuffing, 1 & 3 &
6 enabled)
(for /7 stuffing, 1 - 7
enabled)

FIGURE
BEST 16-BIT SUPER FRAME PATTERN "0000010100110111"
(SYNC LOSS THRESHOLD 8 ERRORS, MIN SUPERFRAME SYNC TIME 5 FRAMES)
(LAST 4 SUPERFRAME SYNC BITS DETERMINE STATE AT WHICH COUNTER BEGINS)

METHOD AND APPARATUS FOR TRANSMITTING DATA IN A HIGH-SPEED, MULTIPLEXED DATA COMMUNICATION SYSTEM

CROSS-REFERENCE TO RELATED APPLICATION

This application is a continuation of and incorporates by reference herein co-pending patent application entitled "Method And Apparatus For Transmitting Data In A High-Speed, Multiplexed Data Communication System" Ser. No. 08/896,610 filed on Jul. 18, 1997, by inventors Peter J. Castagna and David Randall, now U.S. Pat. No. 6,011,807.

FIELD OF THE INVENTION

This application relates to a high speed data transmission system and, specifically, to a method and apparatus for improved data encoding in a multiplexed, high speed data transmission.

BACKGROUND OF THE INVENTION

Many conventional data transmission systems monitor the synchronization of received data frames to verify that the received data is in synchronization with a "superframe" that contains a plurality of multibit "frames". The synchronization monitor may use a method which is too ready to declare loss of synchronization, and is also less ready than is absolutely necessary to declare reestablishment of synchronization (the loss of synchronization forces a total loss of data traffic). A data transmission system that refuses to detect loss of synchronization until the worst possible operating conditions will work best with error correction.

Many conventional data transmission systems use some type of error correction (EC) encoding to send data from transmitter to a receiver. For example, ITU Recommendation G.742, which governs E1 and E2 data transmissions, specifies that each multibit "frame" of E2 data contains one "justification control flag" formed of three redundant justification control bits (also called "stuff bits") per each of the four multiplexed E1 "tributaries." These justification bits are used by the data transmission system to control the justification of received data. ITU Recommendation G.742 is herein incorporated by reference.

As is well-known in the art, three justification control bits per justification control flag allows one error in one justification control bit to be corrected. In this conventional method (majority decision), errors in two or more of the justification control bits cause the justification control flag value to be incorrect.

One type of error in the multibit E2 frame, an error in the justification control flag for an E1 tributary, causes that E1 tributary to experience a synchronization loss or "pattern slip."

When the frame is modified (by adding two-bit EC to the frame) so that the error threshold begins at three errors per frame, the uncorrected E2 frame bit error rate ("E2 BER") level at which pattern slips occur changes very little, although the E1 tributary bit error rate ("E1 BER") is actually greatly improved a that E2 BER level by the two-bit EC. The rate of pattern slips is therefore greatly increased with respect to the E1 BER.

A way of improving the EC of the justification control flag alone, rather than pay the cost of improving the EC of the frame as a whole, and an improved algorithm for superframe synchronization, which together greatly improve the synchronization loss level of the system with only a very slight decrease in data information efficiency, are needed.

SUMMARY OF THE INVENTION

The present invention provides a method and apparatus for detecting loss of synchronization in superframe data and a method and apparatus for detecting resynchronization of a superframe. In addition, the number of justification bits is increased to increase the reliability of the justification flag value without having to add extra error correction circuitry. In a first preferred embodiment of the present invention, a justification flag includes seven justification bits instead of three. In a second preferred embodiment of the present invention a justification flag includes five justification bits.

Another preferred embodiment of the present invention allows backward compatibility between systems having different numbers of justification bits. In order to maintain field compatibility with earlier three bit justification systems, a dedicated bit in the frame, which has a fixed value of "1" in the old system is altered to a value of "0," as a backwards compatibility flag. Newer systems will detect the "0" or "1" at this flag location and activate the proper circuitry to affect the old or new justification method. In this way, a new system can be interconnected with an older system and still function. In order to insure correct recovery of this crucial flag bit in the newer system even under high error rate conditions, the value is sampled for many consecutive frames and only updated if all bits are identical and different from the stored value. A preferred embodiment samples eight consecutive frames.

Thus, the present invention performs more efficient detection of synch loss and detection of resynch. The present invention also incorporates an improved justification method, which, in a preferred embodiment of the present invention, can be backwards compatible with older systems.

In accordance with the purpose of the invention, as embodied and broadly described herein, the invention relates to a method of determining a loss of synchronization in a plurality of frames in a superframe, comprising the steps, performed by a high speed data receiver, of: receiving the plurality of frames, each frame having a respective bit of a plurality of superframe synchronization bits; and comparing the received superframe synchronization bits to a predefined superframe synchronization pattern; determining, if there are at least six errors in the received superframe synchronization bits, that the superframe has lost synchronization.

In further accordance with the purpose of this invention, as embodied and broadly described herein, the invention relates to a method of regaining synchronization of a plurality of frames in a superframe after synchronization has been lost, comprising the steps, performed by a high speed data receiver, of: receiving a plurality of frames, each frame having a respective bit of a plurality of superframe synchronization bits; and comparing the received superframe synchronization bits to a predefined superframe synchronization pattern; and determining, if the received superframe synchronization bits are equal to at least a first number of consecutive bits of the predefined superframe synchronization pattern, that the superframe has regained synchronization.

In further accordance with the purpose of this invention, as embodied and broadly described herein, the invention relates to method of determining whether a stuff opportunity in a frame contains valid data, comprising the steps, performed by a high speed data receiver, of: receiving a high speed data stream, including seven justification control bits; determining a majority value of the justification control bits; and determining, if the majority value of the justification control bits is "1" that a stuff opportunity contains valid data.

A fuller understanding of the invention will become apparent and appreciated by referring to the following description and claims taken in conjunction with the accompanying drawings.

BRIEF DESCRIPTION OF THE DRAWINGS

FIG. 5 is a table showing an example of a one-bit pattern slip and an associated number of bit errors caused by the pattern slip.

FIG. 6 is a table showing a number of bit errors associated with various pattern slips.

FIGS. 9(a) through 9(j) are circuit diagrams showing details of FIG. 7 and 8.

FIG. 11(a) shows an example format of a data frame.

FIGS. 11(b) through 11(d) show examples of frame formats having seven justification bits and a backwards compatible bit.

FIGS. 11(e) and 11(f) provide a key to FIGS. 11 and 12.

FIGS. 12(a) through 12(d) show examples of frame formats having five justification bits.

DETAILED DESCRIPTION OF THE PREFERRED EMBODIMENTS

I. Background

The present invention operates in a high-speed multiplexed data transmission system, such as a multiple-T1 line. A preferred embodiment of the present invention operates in a digital radio for microwave communications, although the present invention could also be implemented in any appropriate system.

Figure 1:
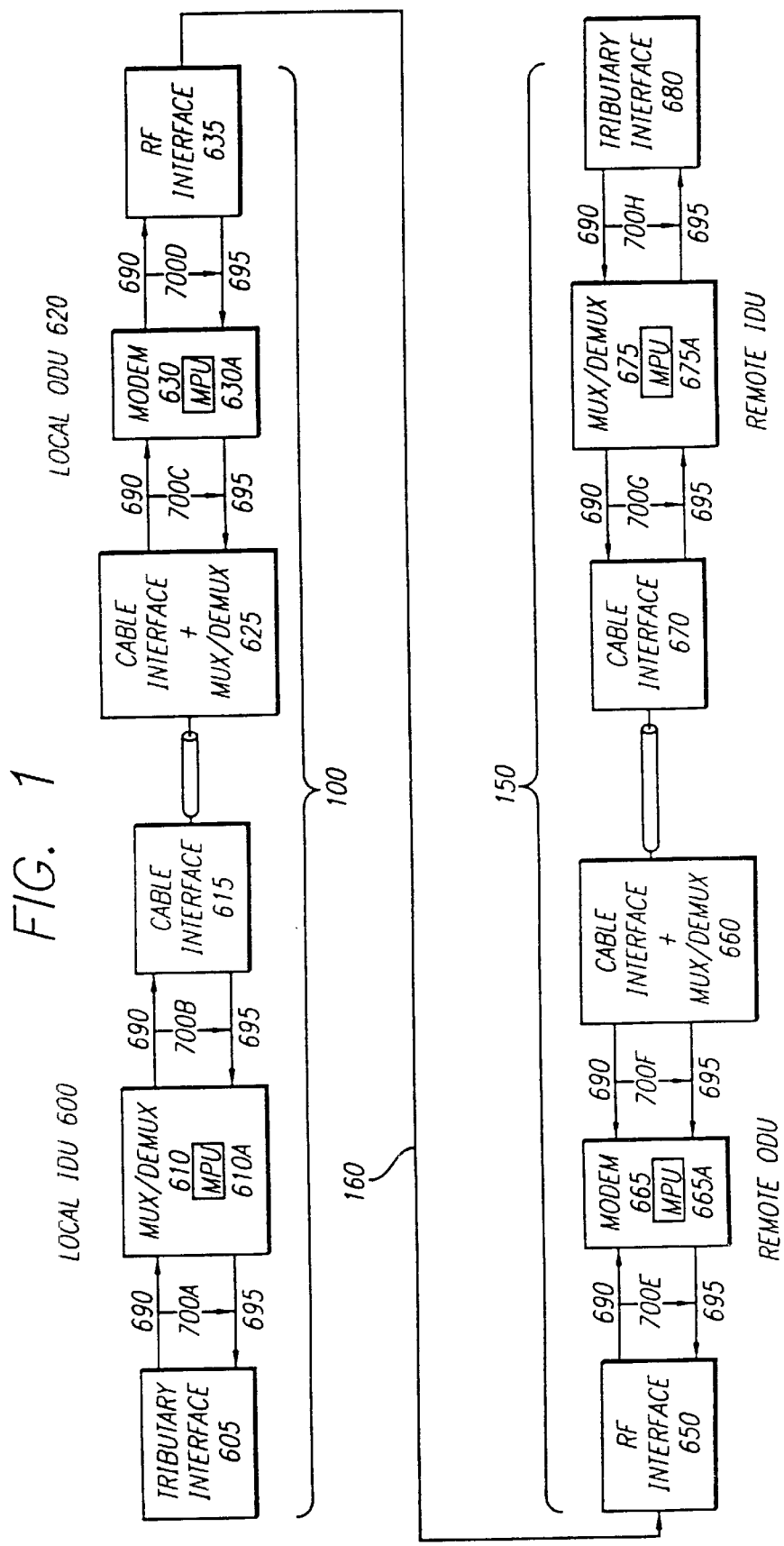
FIG. 1 is a block diagram of a local transceiver and a remote transceiver in an exemplary data transmission system.

FIG. 1 is a block diagram of a local transceiver 100 and a remote transceiver 150 in an exemplary data transmission system. In a presently preferred, but not required arrangement, each transceiver is of the type described in U.S. patent application Ser. No. 08/874661, entitled "Digital Cable System and Method for Microwave Communications," filed Jun. 13, 1997, commonly assigned herewith and incorporated by reference herein, now U.S. Pat. No. 5,987,060. In the system of FIG. 1, a digitally modulated microwave signal 160 travels between local system 100 and remote system 150. Each of local system 100 and remote system 150 operates as both a transmitter and a receiver. Remote system 150 receives multiplexed data from local system 100 and stores it in the form of "superframes" in a memory of remote system 150. The data is then passed to a plurality of "tributaries." A preferred embodiment of the system has a frame rate of 36 KHz through 4.5 KHz and a superframe rate of 36/16 KHz through 4.5/16 KHz. Remote system 150 includes a Remote Indoor Unit (IDU) that includes a MUX/DEMUX 675.

Figure 2:
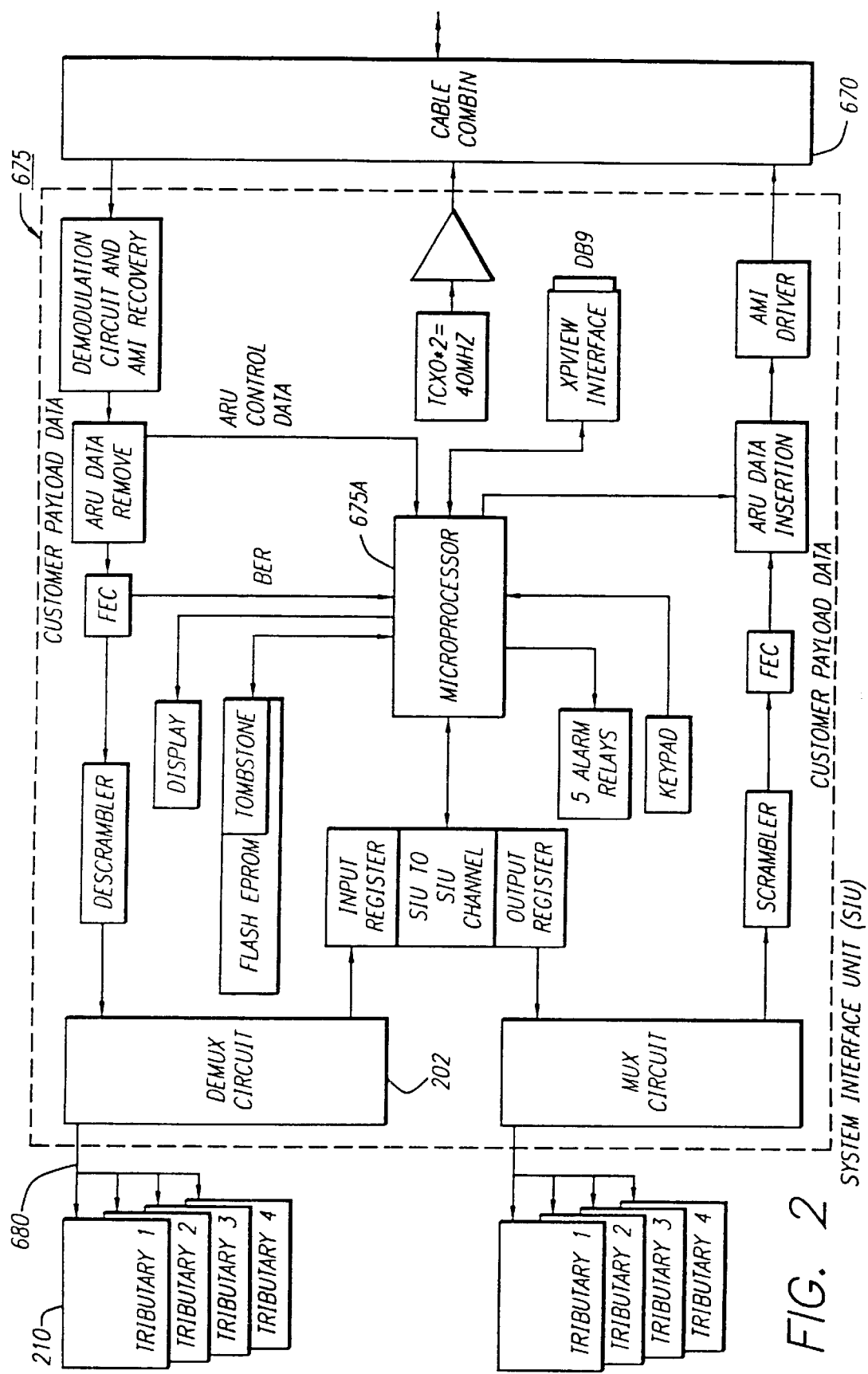
FIG. 2 is a system interface unit (SIU) of FIG. 1.

FIG. 2 is a block diagram of MUX/DEMUX 675 of FIG. 1. In a described embodiment, the functionality described herein is part of an FPGA 202 that implements DEMUX 202. DEMUX 202 receives data, which was originally sent, for example, from system 100, over a cable interface 670. DEMUX 202 outputs multiplexed data streams to a plurality of tributaries 210. It will be understood that MUX/DEMUX 610 of system 100 also includes the functionality described herein, so that system 100 can receive data sent by system 150.

II. Synchronization of a Superframe

Figure 3:
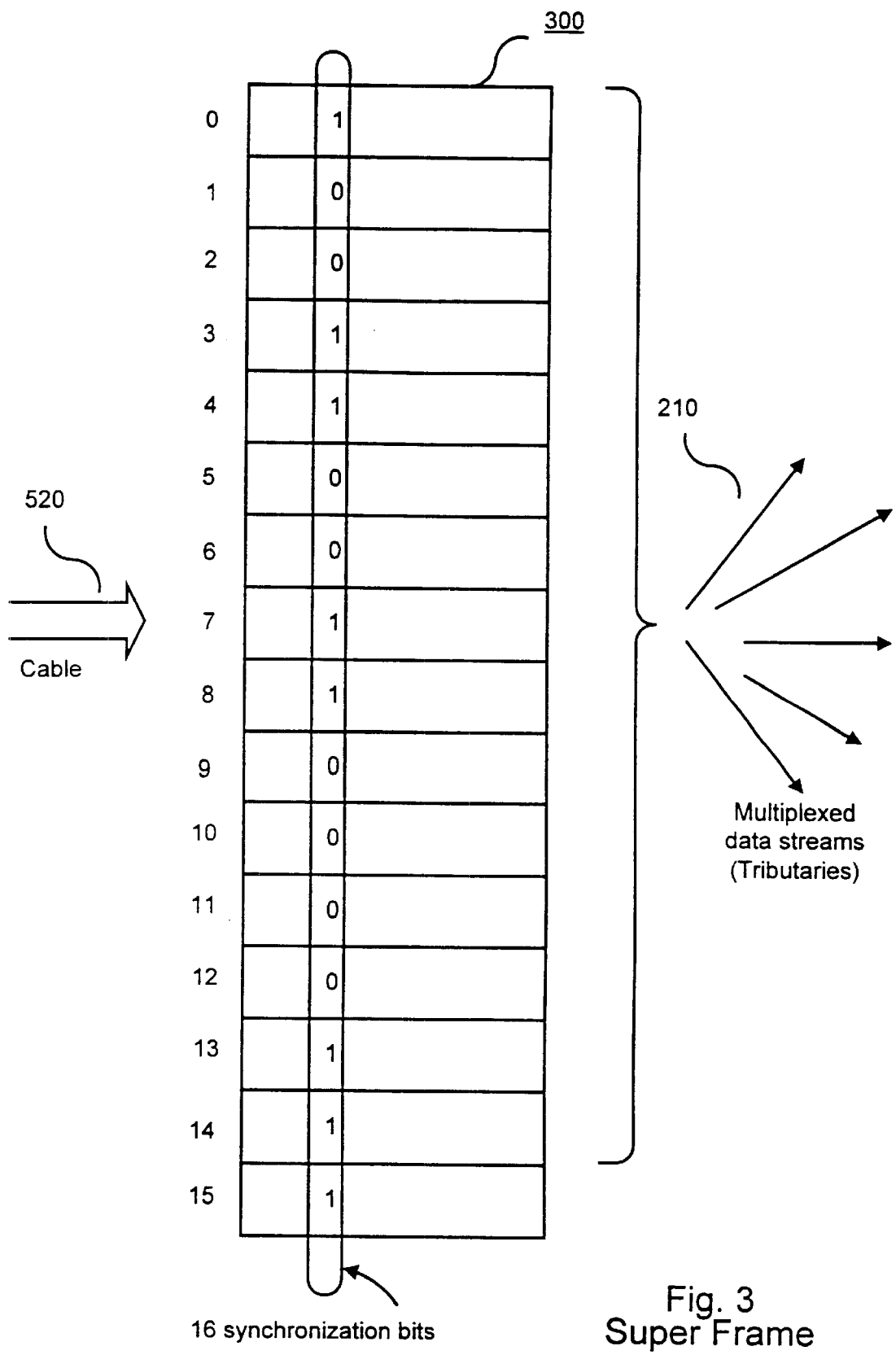
FIG. 3 is a block diagram of a superframe data structure in the system of FIG. 2.
Figure 14:
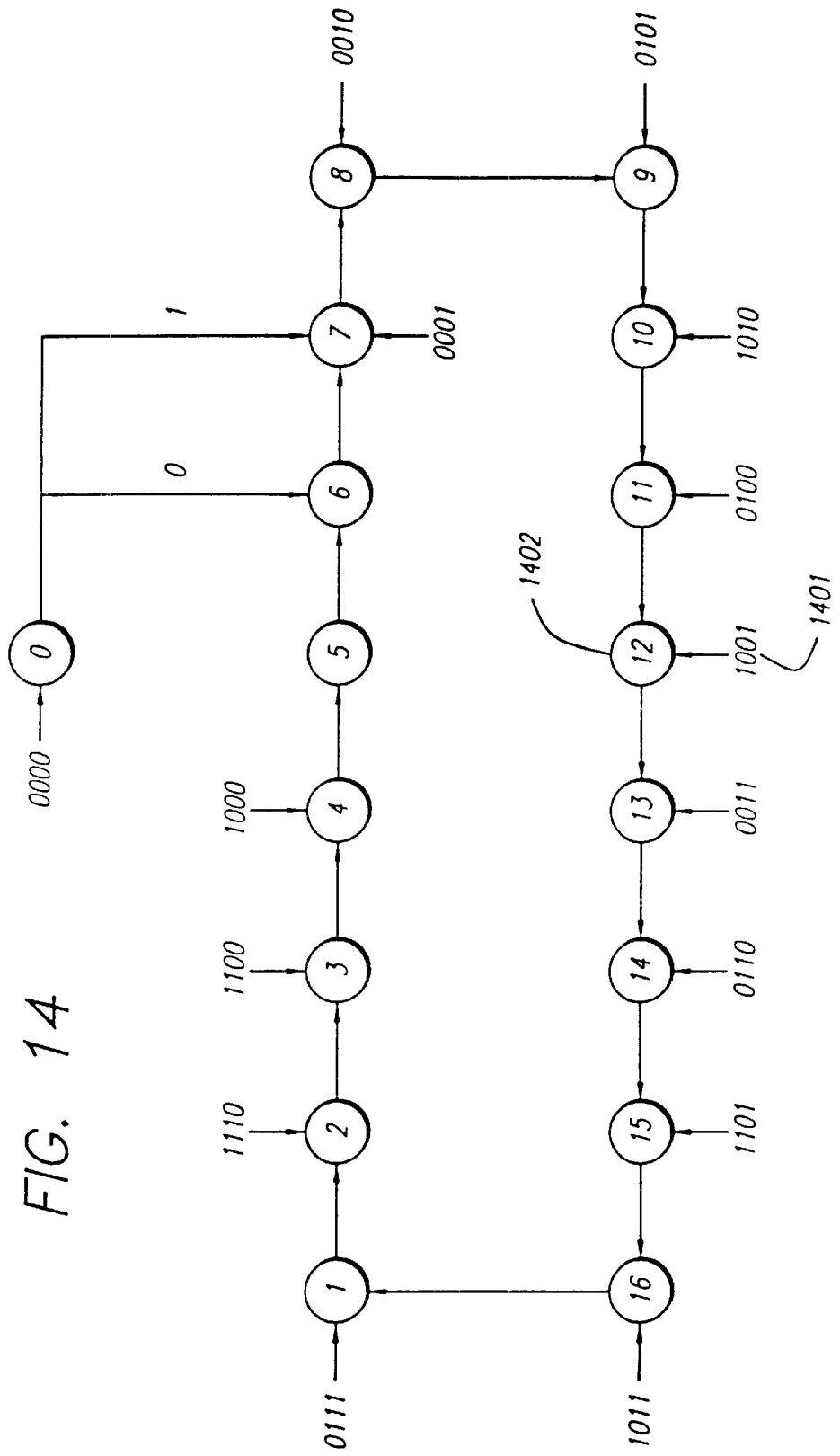
FIG. 14 shows a state diagram of an alternate circuit for establishing superframe synch.

FIG. 3 is a block diagram of a superframe data structure 300 in a memory of MUX/DEMUX 200 of FIG. 2. As will be understood by persons of ordinary skill in the art, the present invention operates in a high speed data stream environment in which high speed data is received at different input rates. The contents of each frame in the superframe is built from a plurality of received data bits. Each item of received data is stored in a corresponding location in a 520 bit frame. Sixteen frames are preferably used to form a superframe. Each frame contains a predefined synchronization bit (also called a "superframe bit"). Thus, the 16 frames in a superframe establish a 16 bit synchronization pattern. In FIG. 3, the bit synch pattern is "1001100110000111", although any appropriate pattern can be used. An appropriate pattern has a very low cross-correlation (See FIG. 6). FIG. 14 shows another appropriate pattern. A superframe is said to be synchronized ("locked") when the 16 synch bits contain the predefined synchronization pattern. FIG. 11(a) shows an example of a frame containing a synchronization bit indicated by reference numeral 1100.

Figure 4:
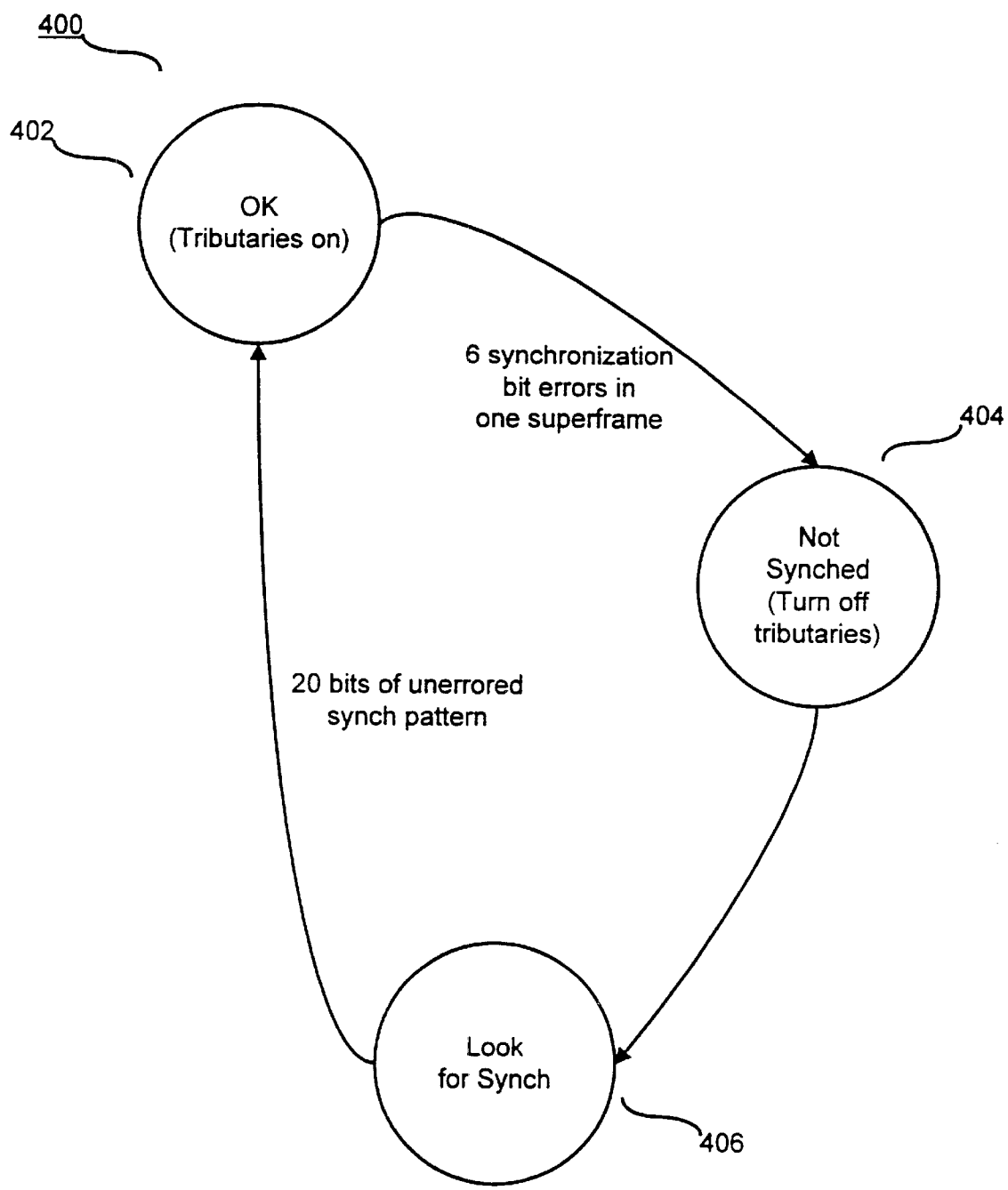
FIG. 4 is a state diagram representing a detection of superframe synch loss and a detection of superframe resynch.

FIG. 4 is a state diagram representing detection of superframe synch loss and detection of superframe resynch. If a superframe is synchronized (state 402) and the receiver detects six or more errors in the synch bits, the current state changes to state 404 (not synched). The receiver then enters a "look for synch" state 406. The receiver determines that synch has been reestablished when it detects twenty consecutive bits of the synch pattern.

FIG. 5 is a table showing an example of a one-bit pattern misalignment of the example synchronization pattern "1001100110000111" and an associated number of bit errors caused by the pattern misalignment. In the table, column 502 represents an expected synch pattern. Column 504 represents the pattern of column 502 shifted by one bit. Column 506 represents a number of bit errors caused by shifting the synch pattern by one bit. As shown in FIG. 5, shifting the synch pattern by one bit causes six bit-errors in the synch bits.

FIG. 6 is a table showing a number of bit errors associated with various pattern misalignments of the example synchronization pattern "1001100110000111". This table shows that false synchronization of superframes will not remain undetected. As discussed above, for example, a misalignment by one bit causes six bit-errors in the synch bits. Similarly, a misalignment by two bits causes twelve bit errors in the synch bits, and so on.

It will be understood that the synch pattern can be any pattern of sixteen bits that causes at least six bit errors for all possible bit misalignments. Alternate embodiments might use a different minimum error number than six. See FIG. 14 for an embodiment using a minimum error number of eight.

Figure 7:
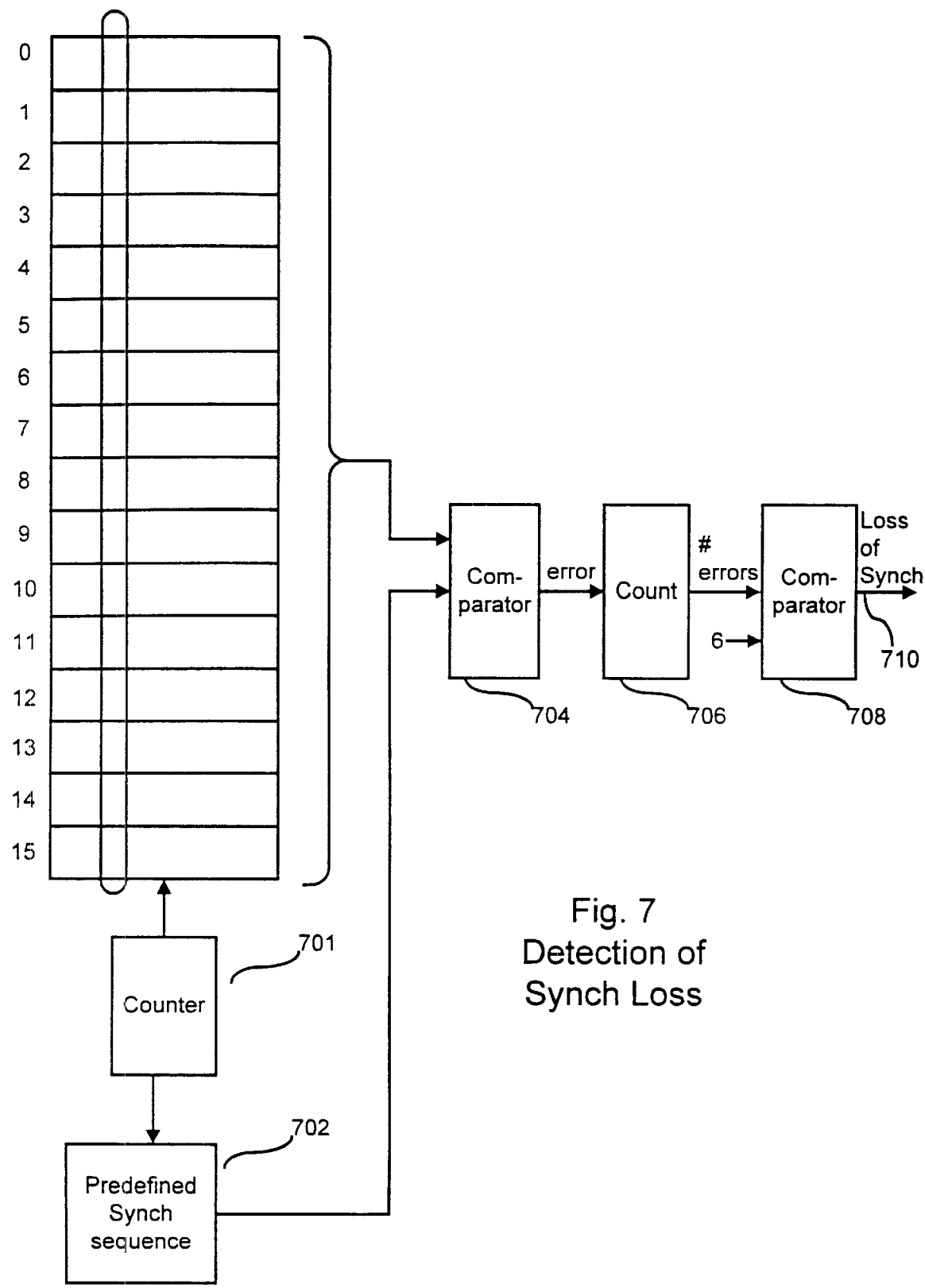
FIG. 7 is a block diagram of a circuit detecting superframe synch loss.

FIG. 7 is a block diagram of a circuit detecting superframe synch loss. As the synch bits of the superframe are received, they are compared to respective bits of a predefined synch pattern. If respective bits of the synch bits and the synch pattern do not match, an error is found for the synch bits. A counter 706 counts the number of errors for the frame. If six or more errors are found, then a "loss of synch" signal 710 is set active.

Figure 8:
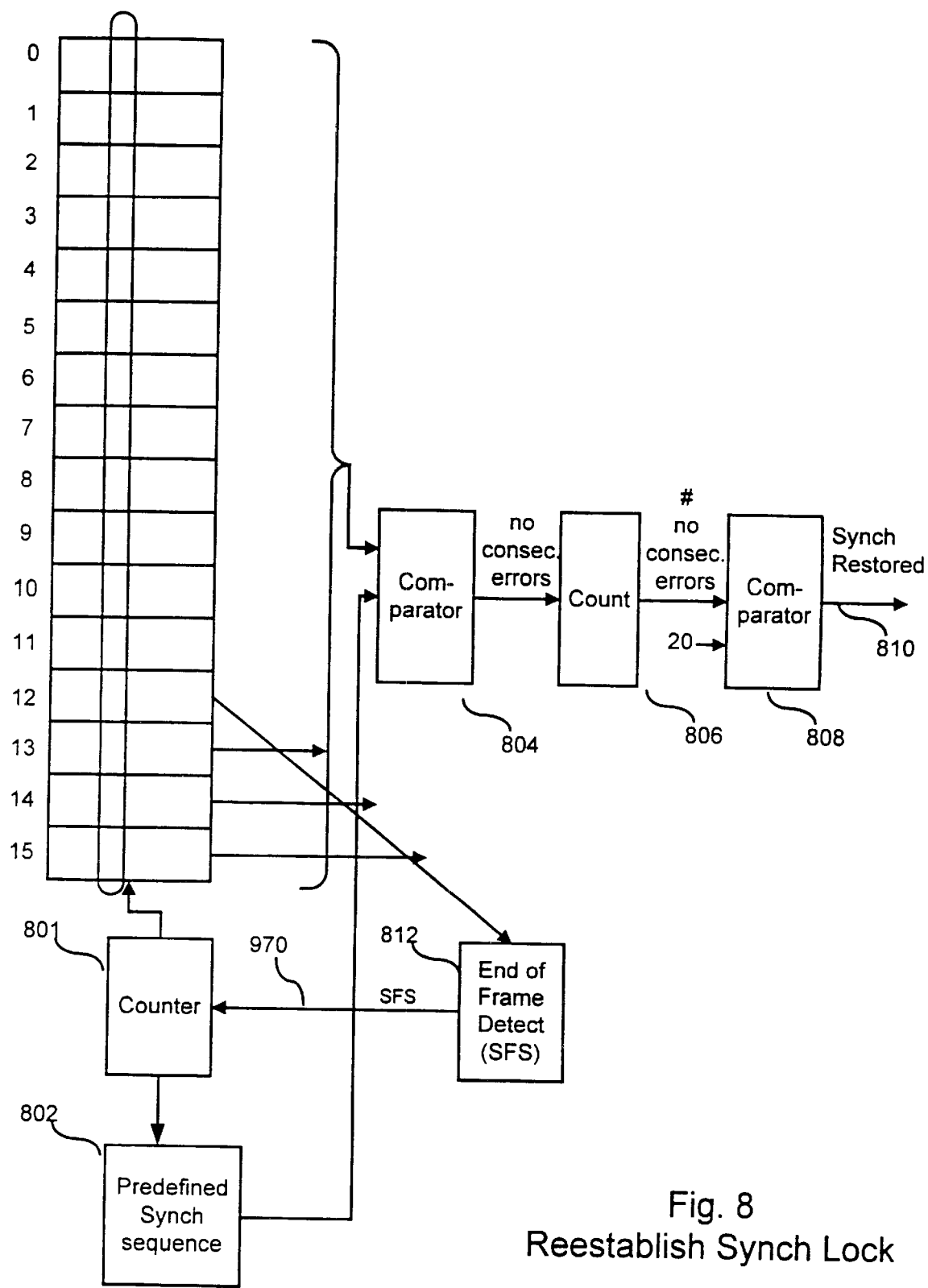
FIG. 8 is a block diagram of a circuit detecting superframe resynch.

FIG. 8 is a block diagram of a circuit detecting superframe resynch. In a preferred embodiment, the receiver compares respective bits of the synch bits and the predefined synch pattern. If twenty consecutive bits are found to match, the system determines that the superframe has resynched and sends a Synch restored signal 810.

FIGS. 9(a) through 9(j) are circuit diagrams showing details of the circuitry of FIGS. 7 and 8. Some of this circuitry is shared between the synch loss detection function of FIG. 7 and the synch regain function of FIG. 8. The input superframe synchronization bits of respective received frames are input to the circuitry of FIG. 9 as a signal MUXDDLY 998 of FIG. 9(g) in accordance with a clock signal RXSYSCK 904 of FIG. 9(a).

Figure 9A:
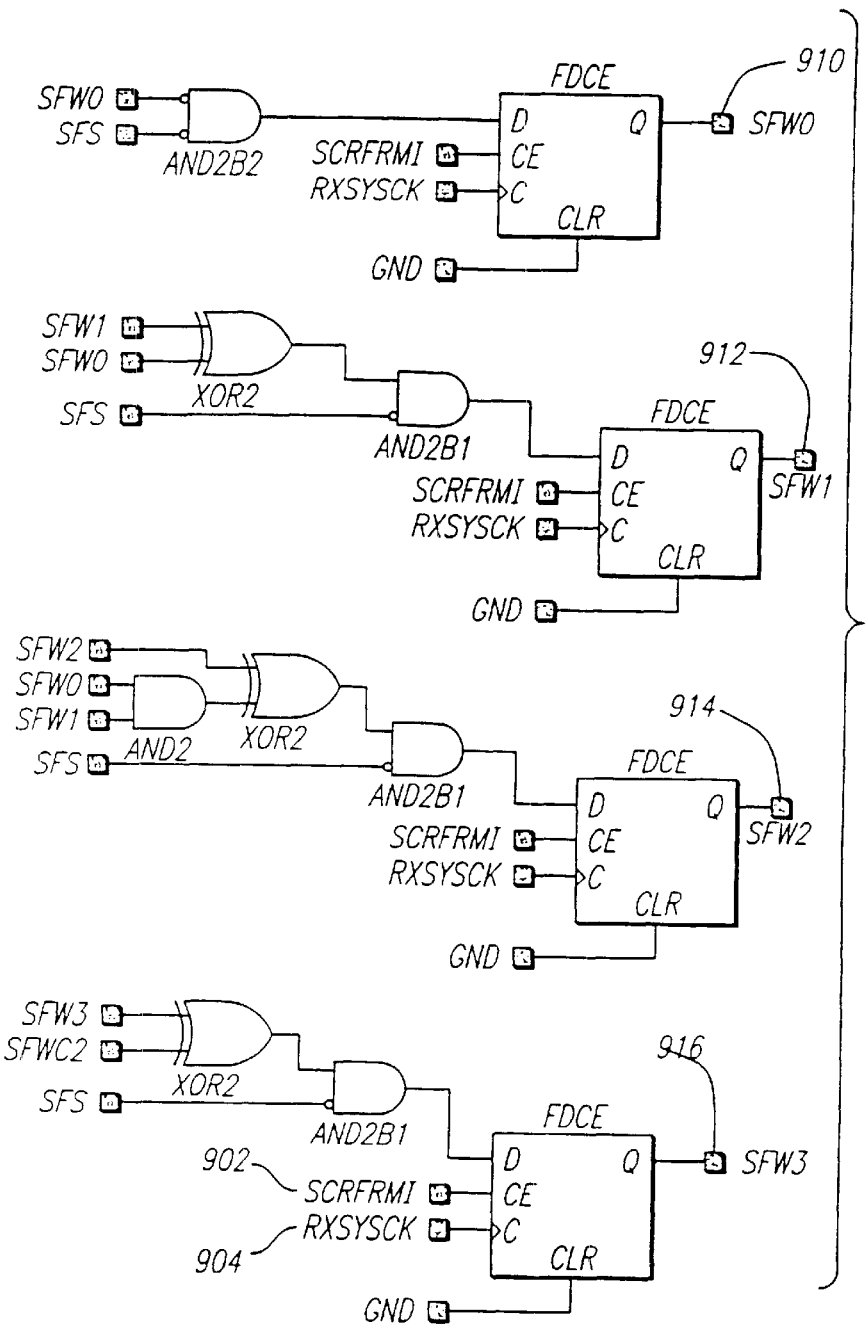
Figure 9B:
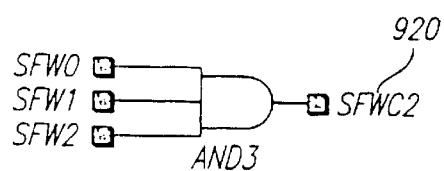

In FIGS. 9(a) and 9(b), elements 910, 912, 914, 916, 920 form a superframe counter. An input signal SCRFRMI 902 is active (high) during the superframe synchronization bit of each frame. The input signal RXSYSCK 904 is the system clock of the receiver, synchronized to the bits of the superframe.

Figure 9C:
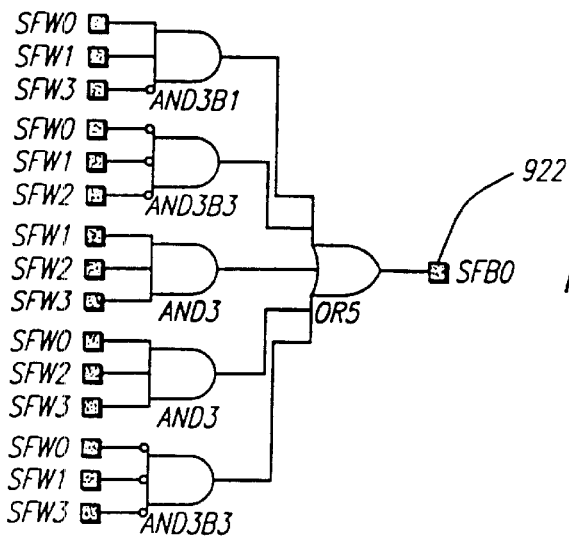
Figure 9D:
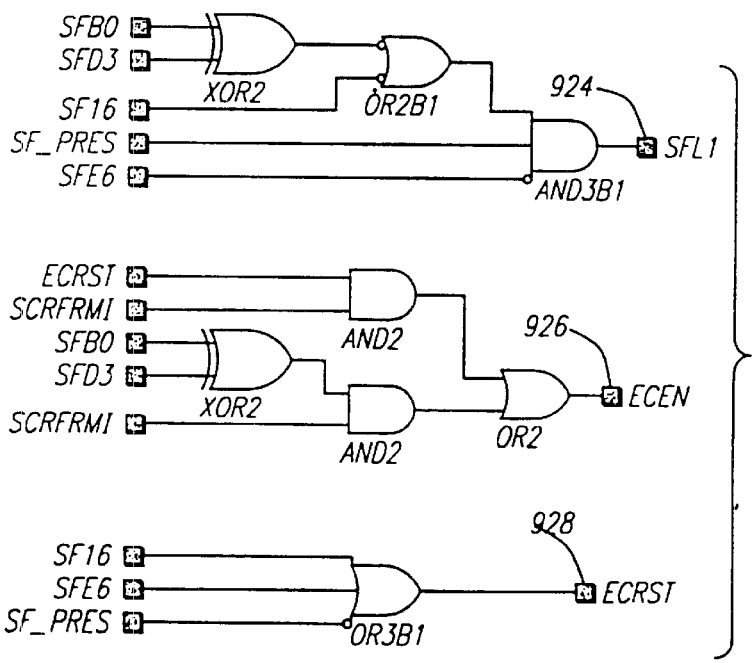
Figure 9E:
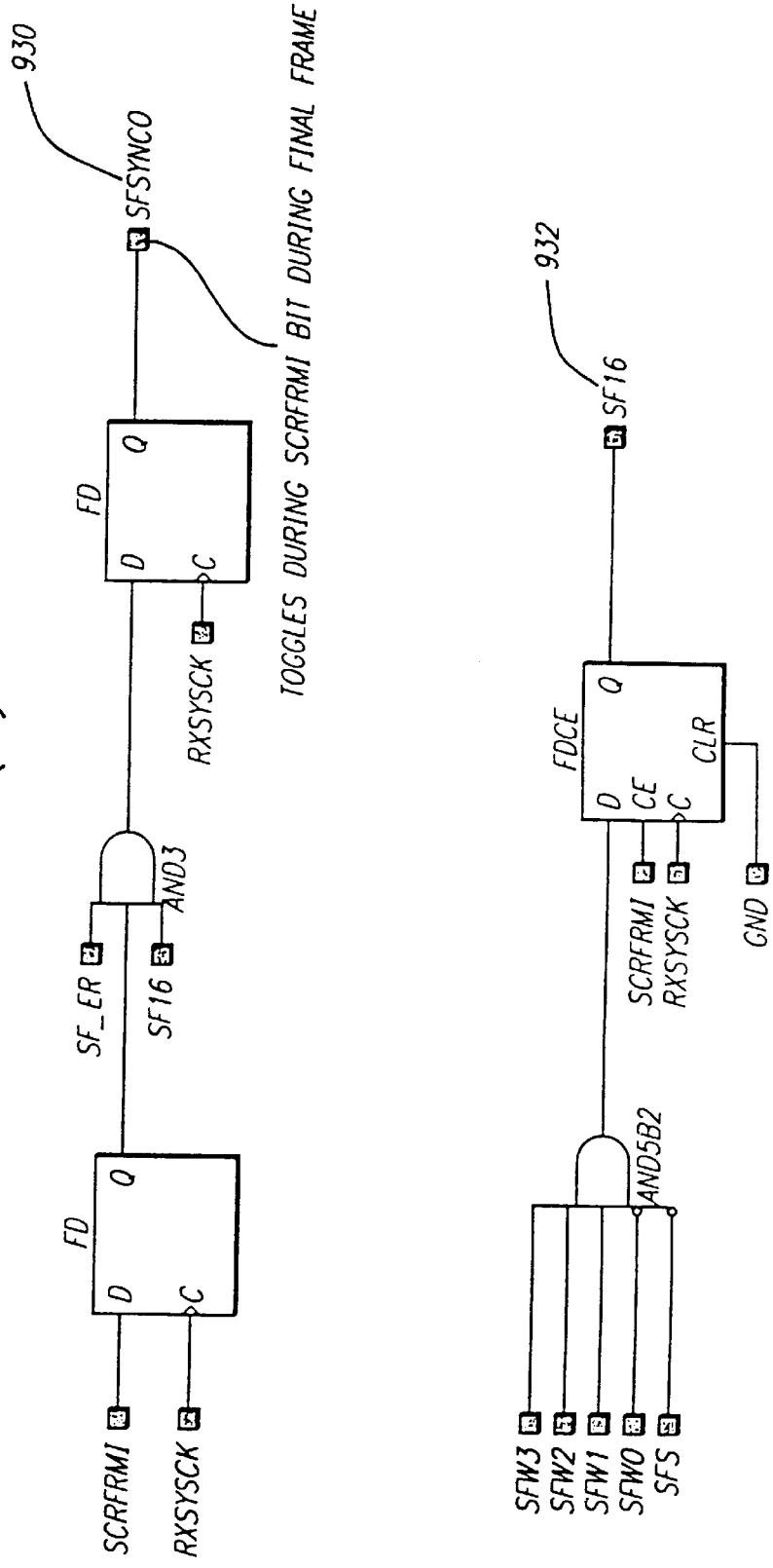
Figure 9F:
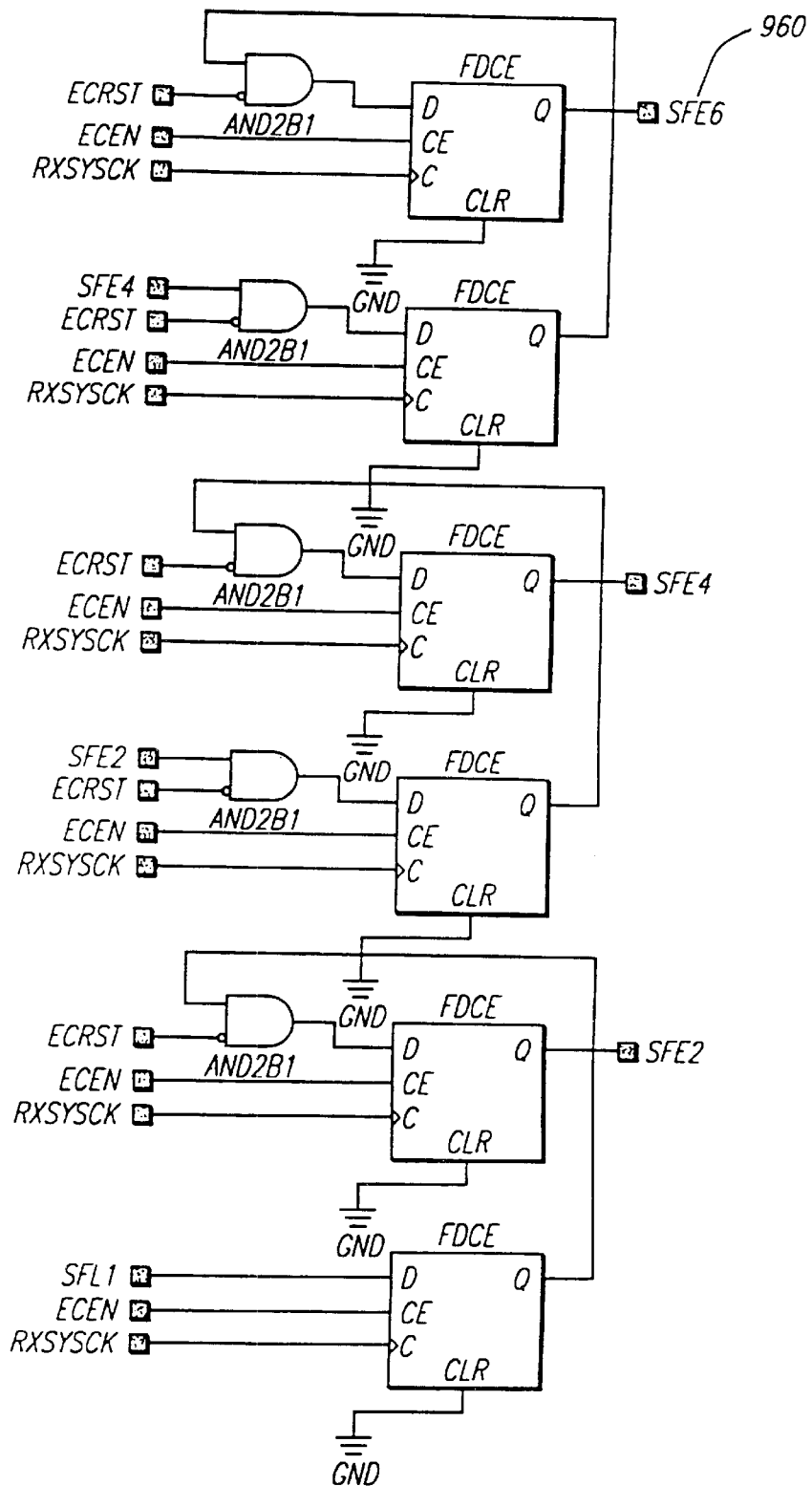

In FIG. 9(c), signal 922 tests for the expected sequence of superframe synch bits. In FIG. 9(d), signals 924, 926, 928 detect errors in the synch bits and drive the error counter of FIG. 9(f) accordingly. The circuitry of FIG. 9(e) generates a SF16 signal 932 when it detects the end of the superframe (i.e., when it detects the 15$^{th}$ subframe). FIG. 9(e) also outputs a SFSYNCO signal 930 that detects the end of a superframe after synchronization is achieved. The circuitry of FIG. 9(f) outputs an SFE6 signal 960 when six errors are detected for the superframe.

FIGS. 9(g) and 9(h) show circuitry that detects the start of the synch pattern ("0111"). When the beginning of the pattern is detected, the receiver sends a Superframe Start (SFS) signal 970. In FIG. 9(j), the receiver outputs a Superframe present (SF_PRES) signal 980 when twenty bits of the synch pattern have been found. The SF_ER signal 982 of FIG. 9(j) is active high during the initial search for twenty correct synch bits only. It should be noted that the synch detector circuitry also uses the counter of FIG. 9(f).

Figure 10A:
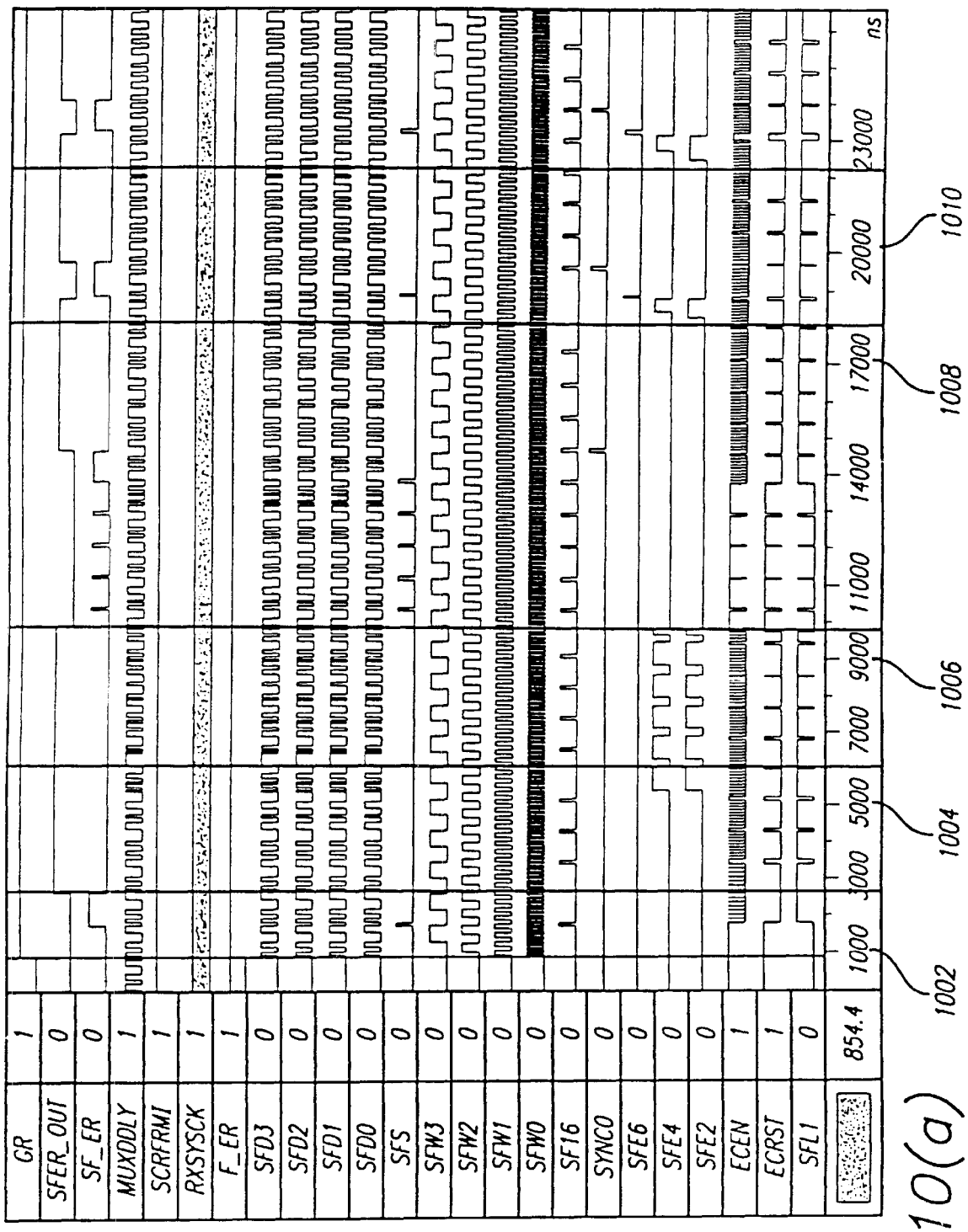
FIG. 10(a) is a timing diagram of the circuitry of FIGS. 9(a) through 9(j).
Figure 10B:
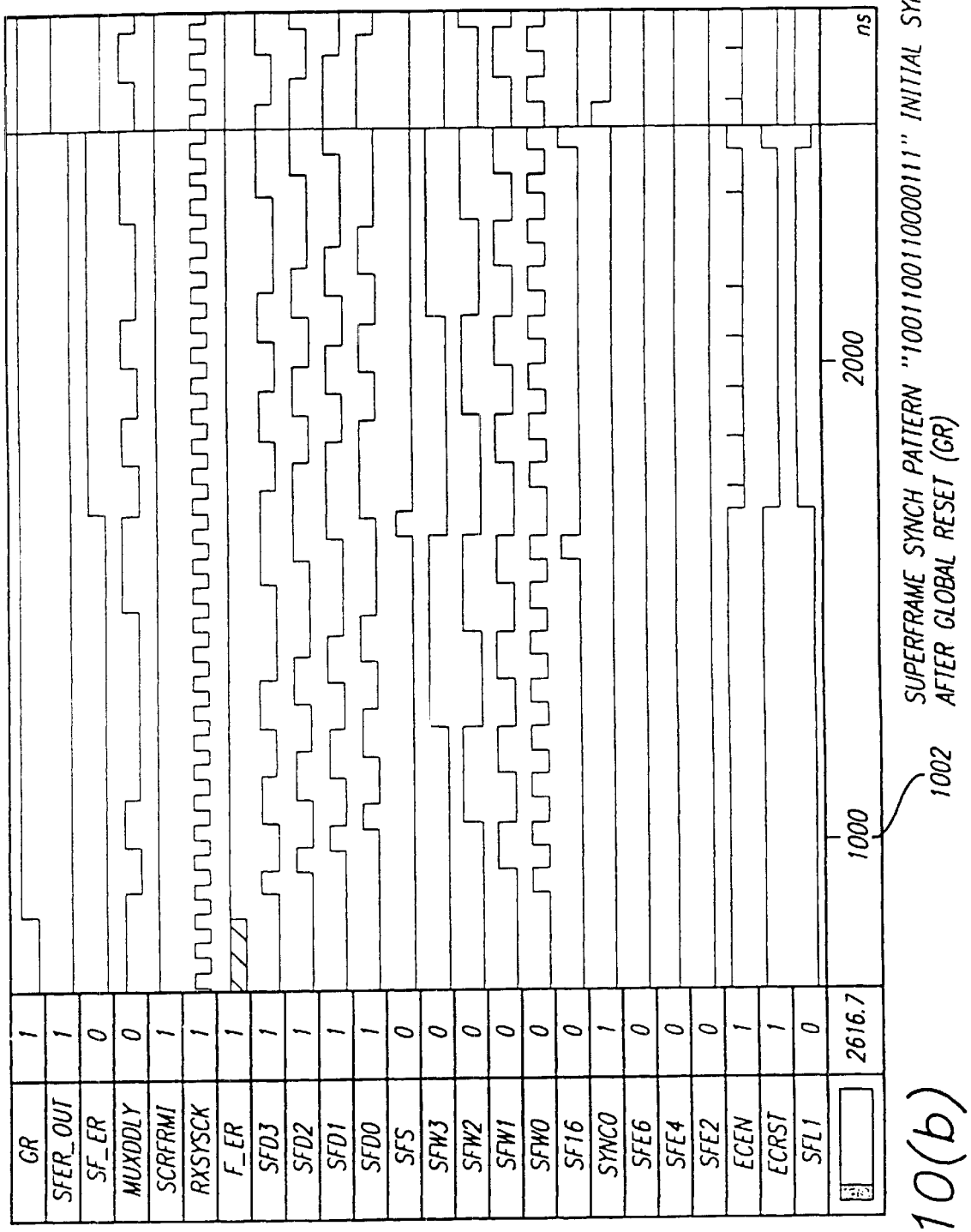
FIGS. 10(b) through 10(f) provide details of the timing diagram of FIG. 10(a).
Figure 10C:
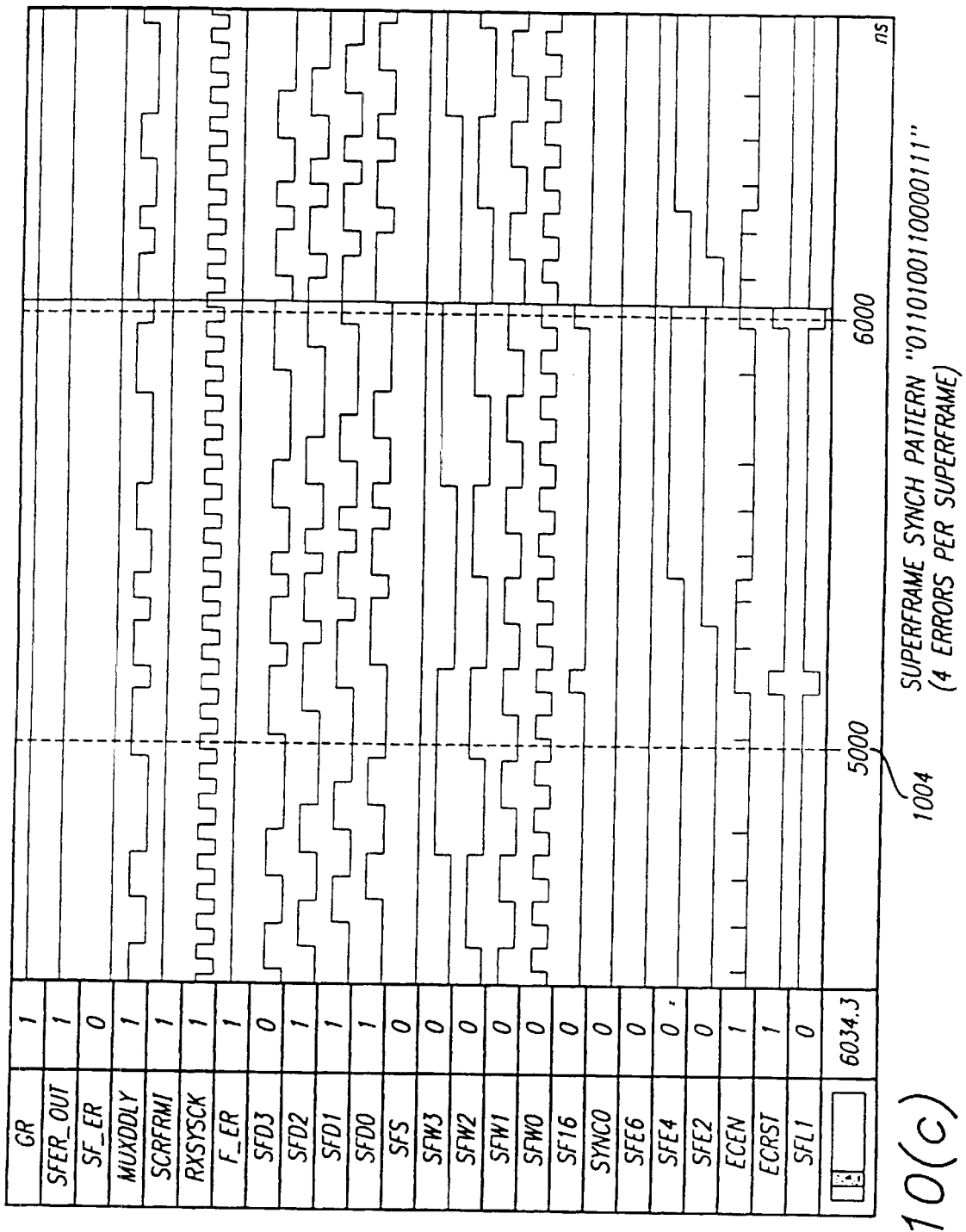
Figure 10D:
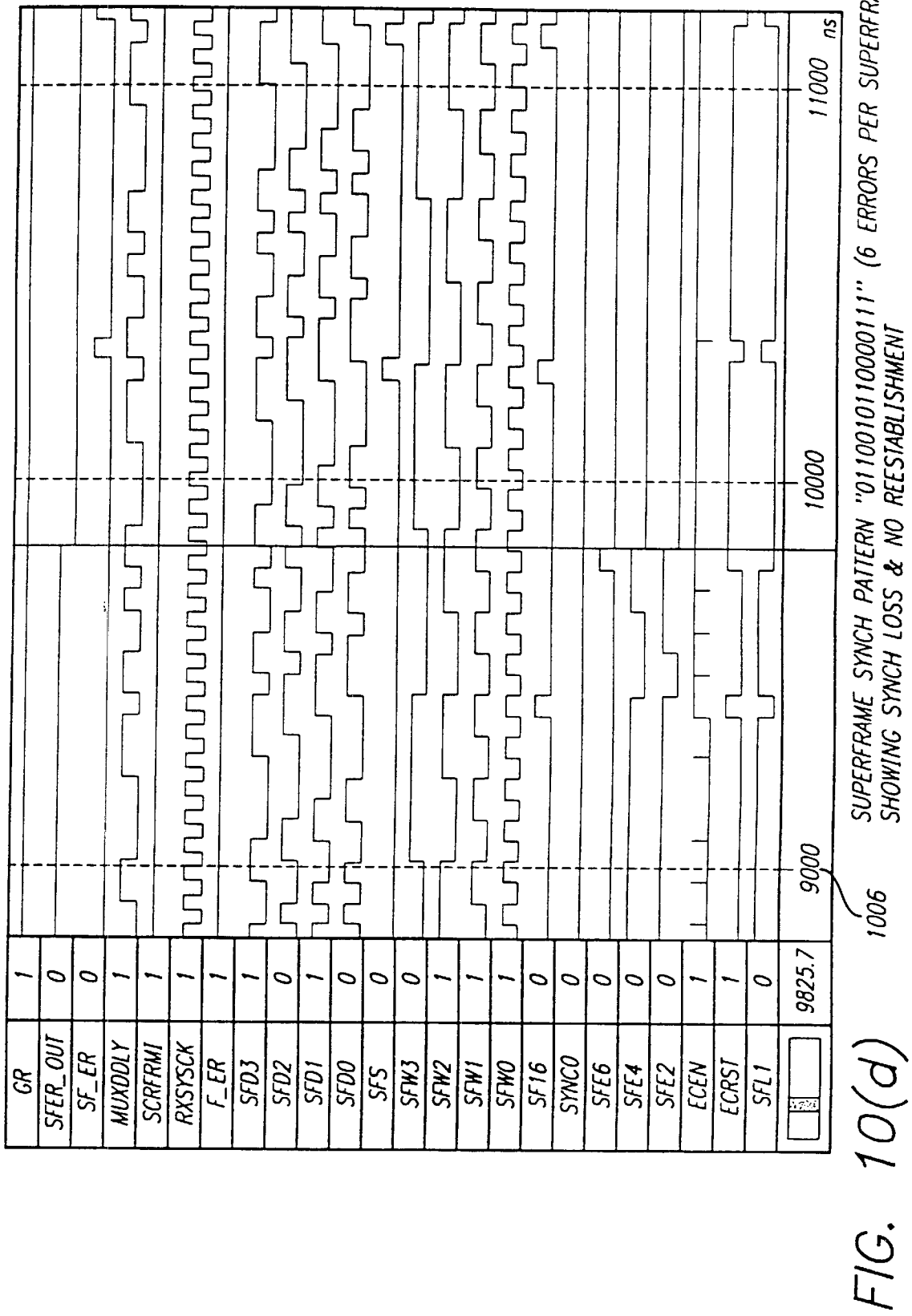
Figure 10E:
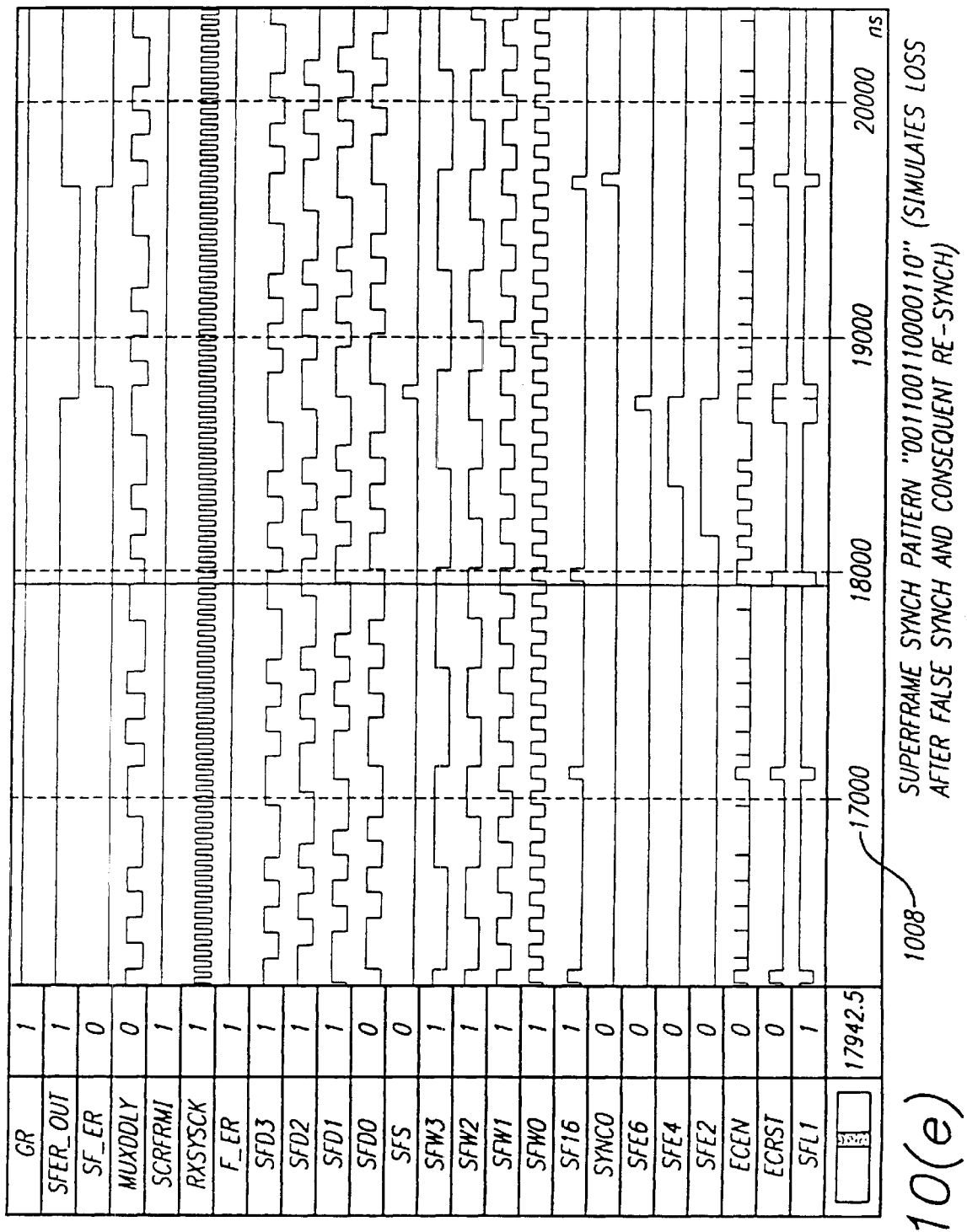
Figure 10F:
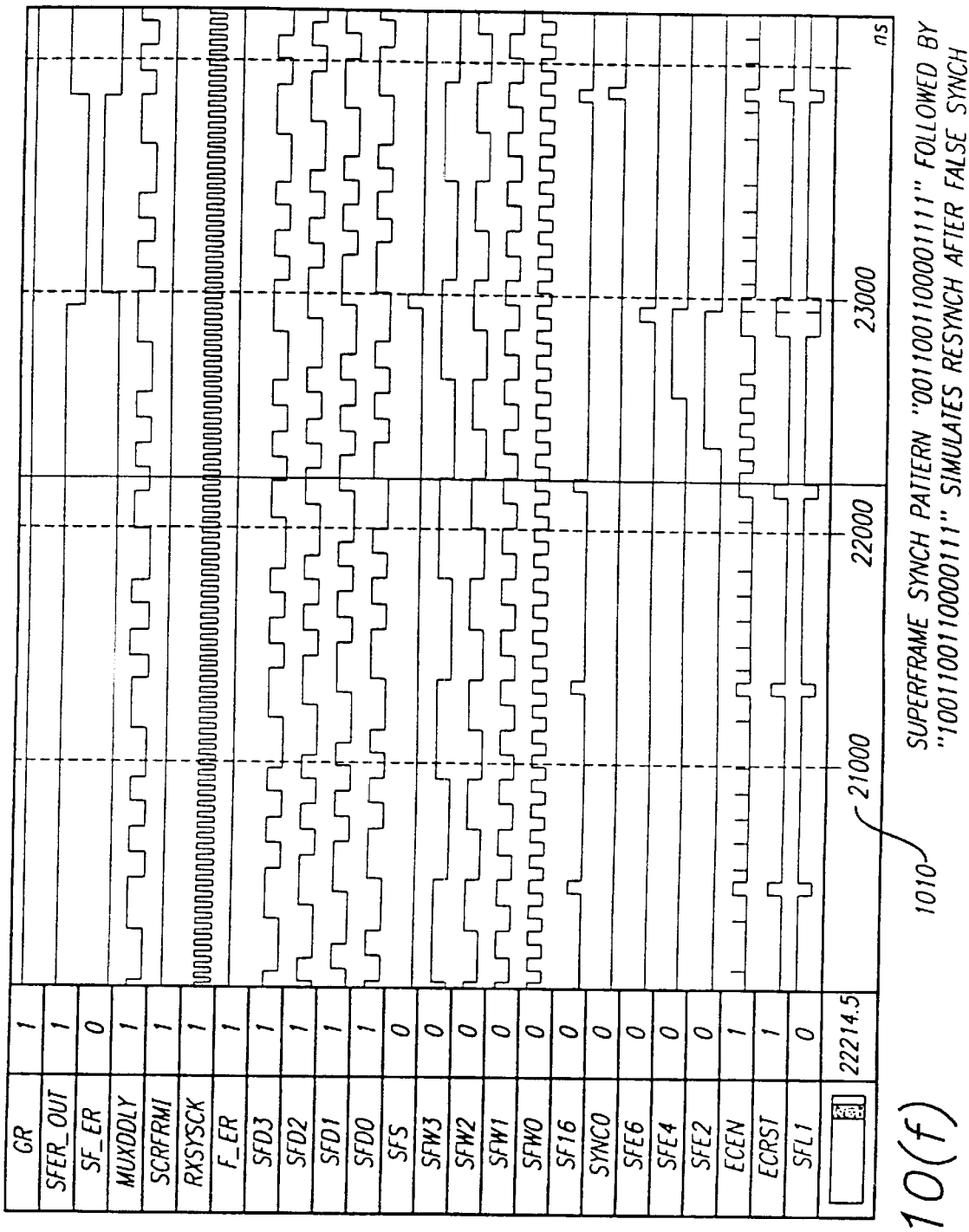

FIG. 10(a) is a timing diagram of the signals in the circuitry of FIGS. 9(a) through 9(j). FIGS. 10(b) through 10(f) provide details of FIG. 10(a). Specifically, FIG. 10(b) shows an example of a superframe synch after a global reset (GR). FIG. 10(d) shows an example of a superframe synch loss, with no reestablishment. FIG. 10(e) shows an example of a superframe resynch after a "false synch." Loss of superframe synchronization is indicated by SFER_OUT active low.

III. Justification and Backwards Compatibility

As is known to persons of ordinary skill in the art, the presence of valid data in one or more "stuff opportunity" bits of the frame is indicated by setting a justification control flag (also called a "stuff flag") of the frame. Each frame contains redundant copies of the justification control bit. In the described embodiment, each justification control flag controls one stuff opportunity for a tributary. The position of the justification control flag in the superframe determines which tributary is indicated. When a majority of the justification control flags for a tributary are active, the justification control flag is set for the tributary. If the justification control flag is set, valid data is present in the "stuff opportunities" of the frame for the tributary. Other embodiments may include multiple justification control flags per frame, where each justification control flag has redundant bits, and controls a single stuff opportunity.

Because it is desirable for systems having varying sizes of justification control flags to work together, frames of certain embodiments of the present invention include a backwards compatibility flag. The bits currently being used for the backwards compatibility flag in the current invention were defined as to be set ("1") in earlier systems, but were not defined as a backwards compatibility flag. These bits were used as part of an IDU "FIRMWARE VERSION" flag, which was defined to have a certain bit set to "1". Thus, all bits of the backwards compatibility flag are set ("1") in old systems having three-bit justification control flags. In contrast, all bits of the backwards compatibility flag are clear ("0") in a system having a seven-bit justification control flag. Thus, a receiver can determine whether a sending system uses a conventional three-bit justification control flag or a seven-bit justification control flag by checking the backwards compatibility flag. Other embodiments of the present invention may use a different bit or bits that had a predefined value in older systems as a backwards compatibility flag.

Figure 11C:
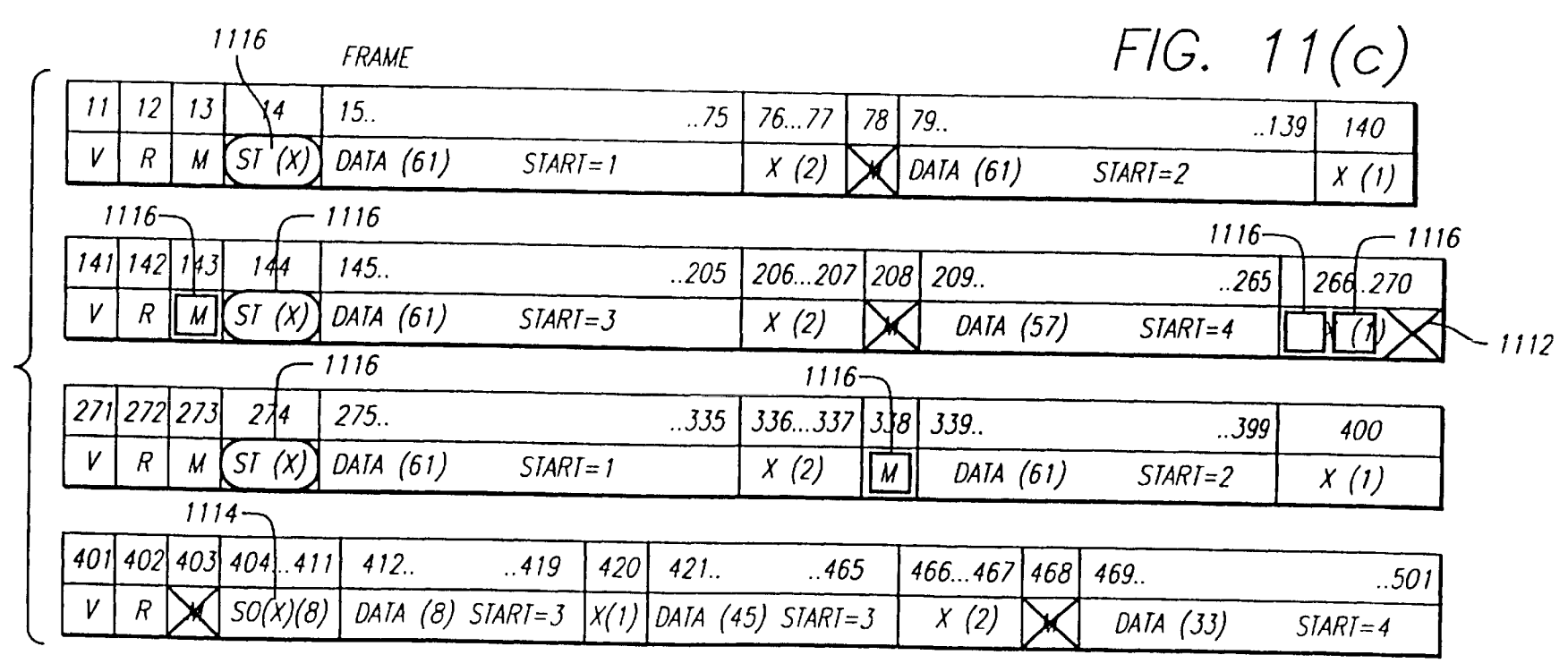
Figure 11D:
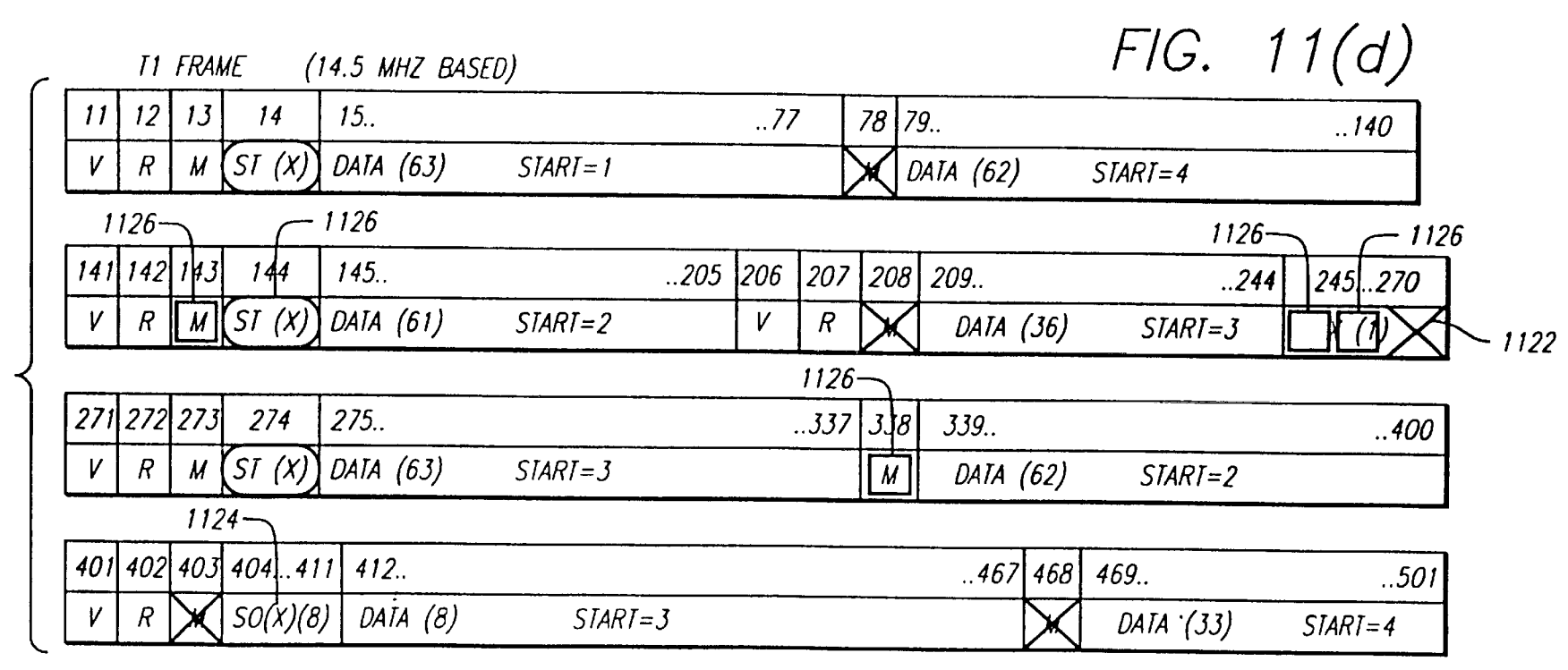
Figure 12C:
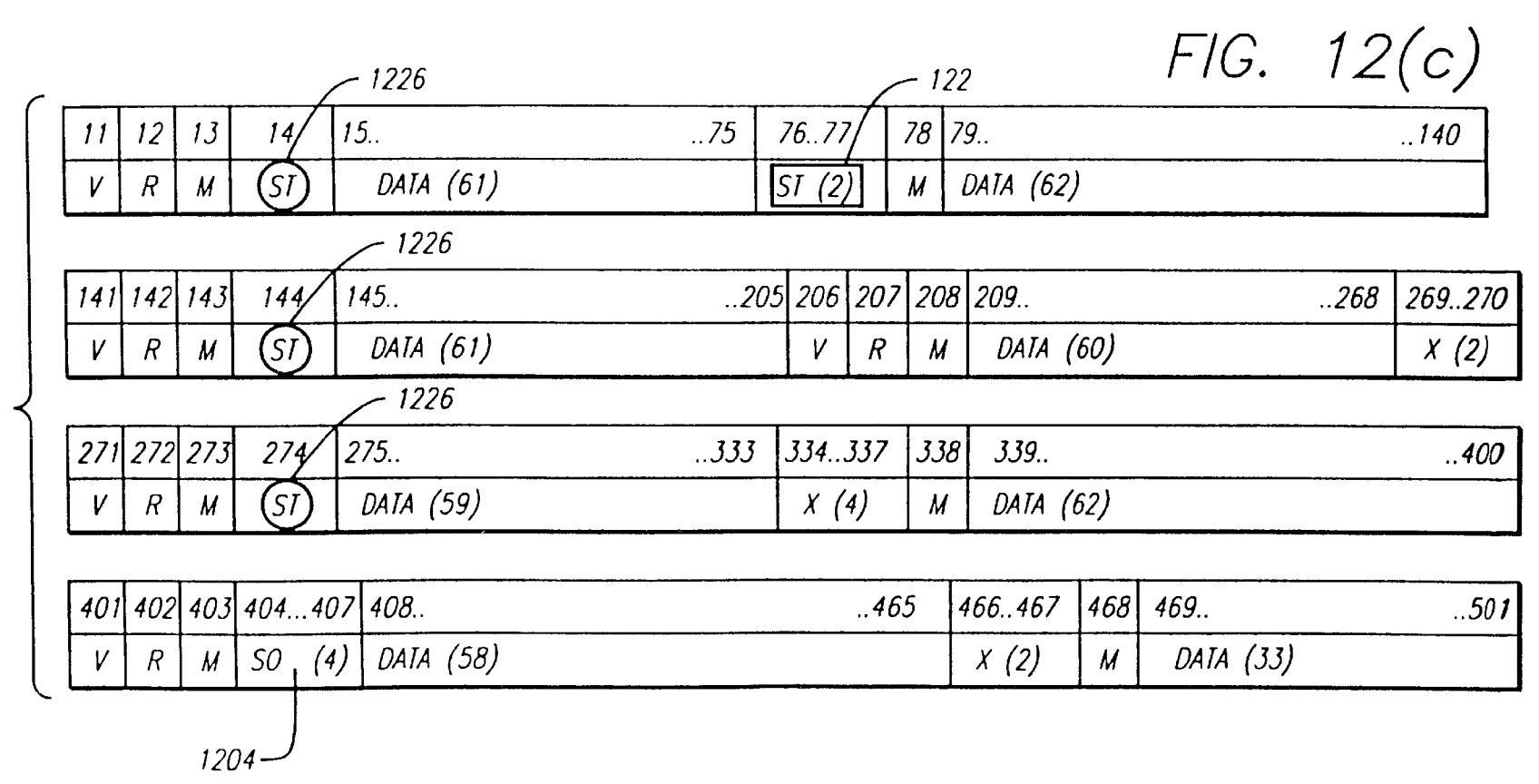
Figure 12D:
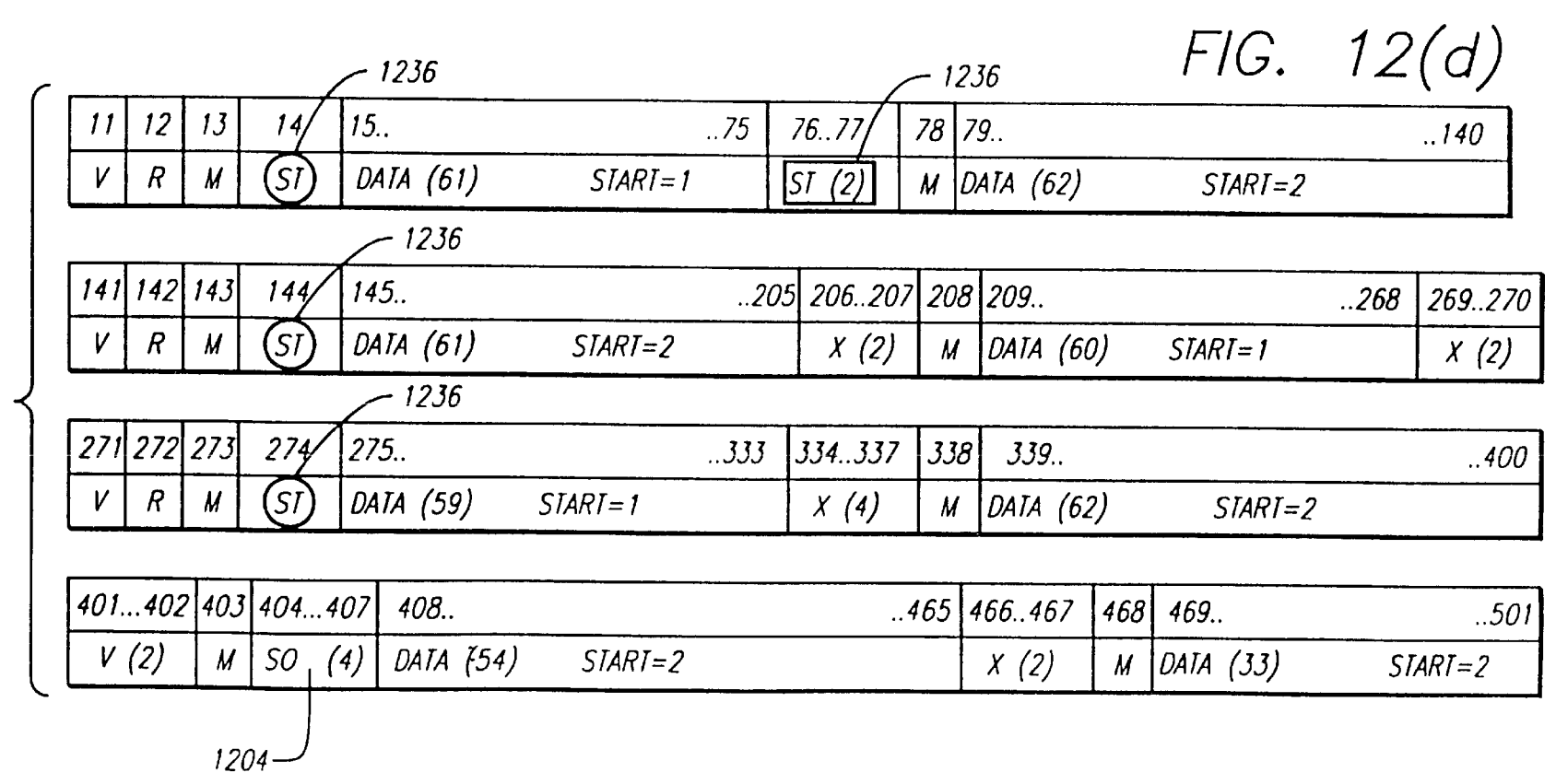

FIG. 11 generally shows a plurality of frame formats having additional redundant justification bits and a backwards compatible flag. FIG. 11(a) shows a basic format for a frame. FIGS. 11(b)–11(d), respectively, show the following frame formats: 2XE1; 4XE1; and 4XT1. As shown in FIGS. 11(b)–11(d), each frame has seven justification control bits (1106, 1116, 1126), as represented by circles and square boxes. Each frame also contains a backwards compatibility flag (1102, 1112, 1122), represented by an asterisk. Each bit of the justification control bits should have the same value. FIGS. 11(e) and 11(f) provide keys to FIGS. 11(b)–11(d) and to FIG. 12.

FIGS. 12(a)–12(d), respectively, show formats of the following frames: 4XE1C; 8XE1C; 4XT1C and 8XT1C. (The number preceding the "X" represents number of output tributaries 210). As shown in FIGS. 12(a)–12(d), each frame has five justification control bits (1206, 1216, 1226), as represented by circles and square boxes. Unless a transmission error has occurred, all of the justification control bits in a justification control flag should have the same value. The frames of FIG. 12 do not have a backwards compatibility flag, but other five bit justification control flag embodiments may include such a flag.

Figure 13A:
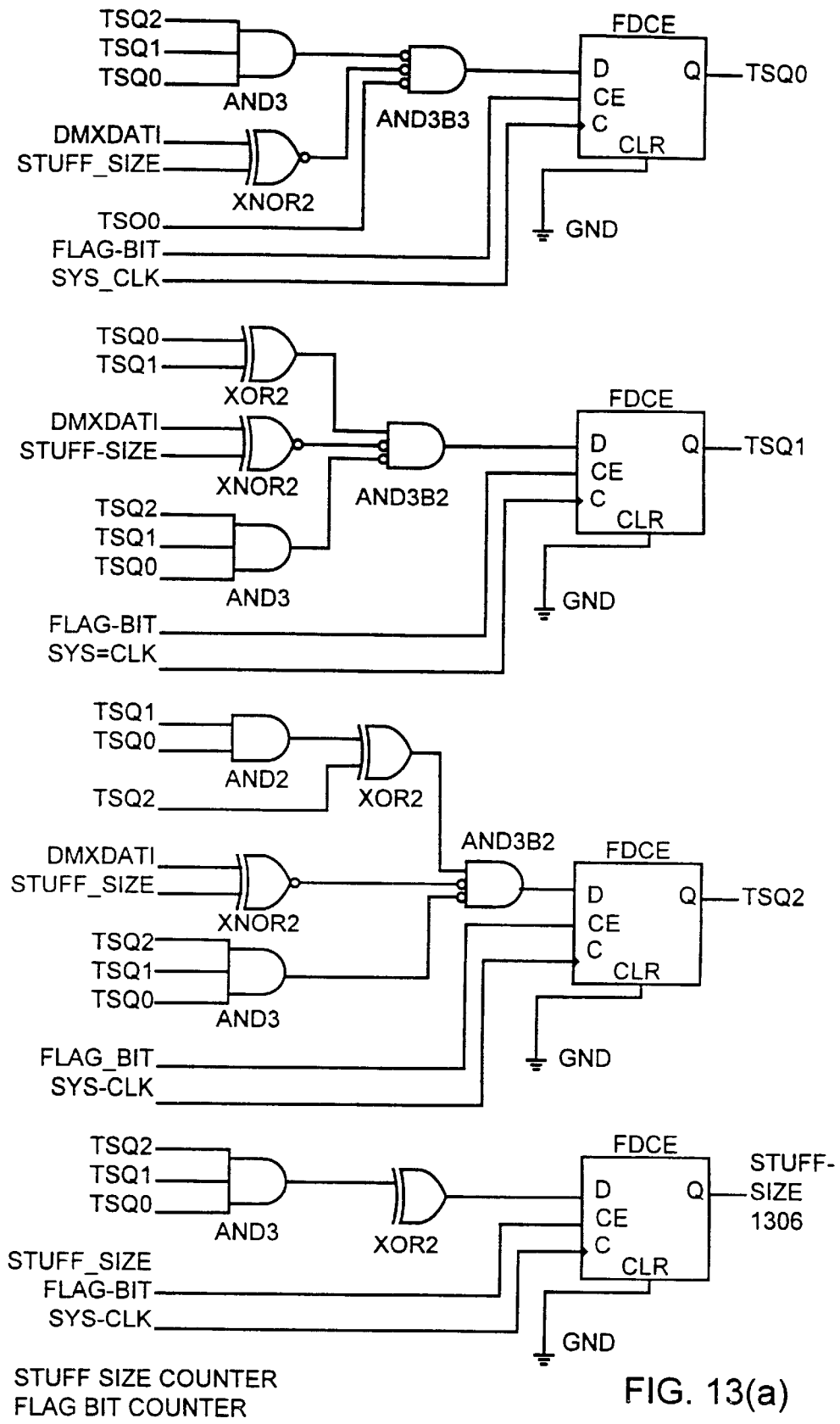
FIGS. 13(a) through 13(c) are circuit diagrams showing use of the justification bits and backward compatibility flag.
Figure 13B:
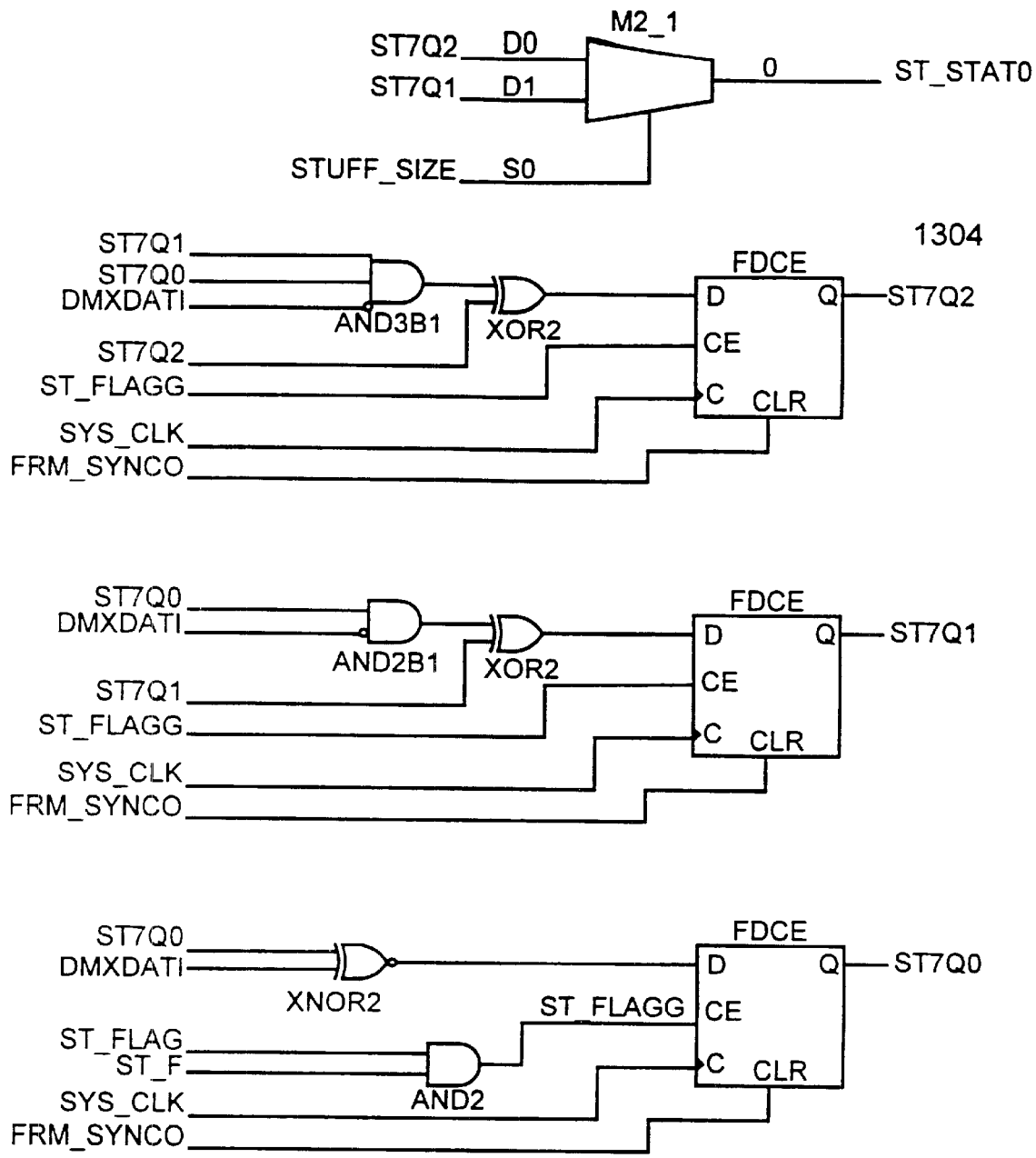
Figure 13C:
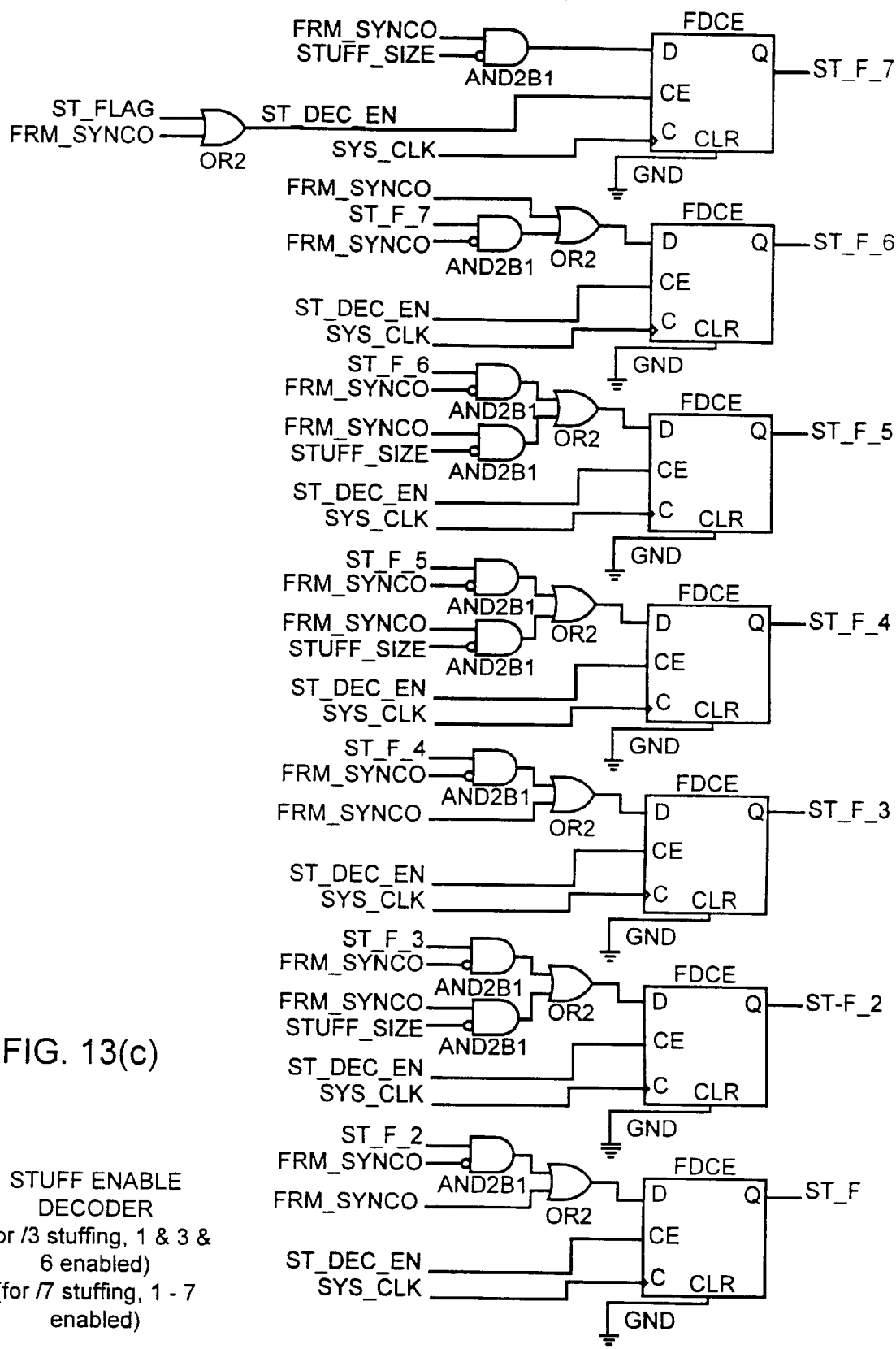

FIGS. 13(a) through 13(c) are circuit diagrams showing how to determine the setting of the majority of the justification control bits.

FIG. 13(a) sets the stuff size control based on whether eight "1" flag bits in a row or 8 "0" flag bits in a row are detected. The system preferably assumes 7 bit justification control. The probability of a false switching is $BER^8$, or for BER of 1×10$^{-3}$, the probability is about 1×10$^{-24}$ per frame. A signal stuff_size 1306 indicates whether the justification control flag is 3 bits or seven bits. Active low indicates seven bits.

FIG. 13(*b*) recovers the value of the justification control flag for the frame. Four new bits in the aggregate data stream (common among 4XE1, 2XE1, and 4XT1) are used to increase the number of stuff control bits to use. The circuit of FIG. 13(*b*) sets the justification control flag result to "1" if four or more of the received stuff bits are set to "1" (or if two or more bits are set to "1" for a 3 bit method). This is accomplished by incrementing a counter every time a value of "1" is received, then outputting a one if the count exceeds three (or one for 3-bit systems). This changes the probability of a justification control flag error from (3×BER$^2$−2×BER$^3$) to (35×BER$^4$−84×BER$^5$+70×BER$^6$−20×BER$^7$) per frame.

FIG. 13(*c*) shows a circuit that blanks the four new justification control positions for three bit stuffing and blanks all justification control positions after the seven justification control positions. This prevents the new justification control positions from altering the majority value when operating in three bit mode, and prevents the stuff opportunity from modifying the final value of the majority result.

A system having five justification control bits, such as a system using the frame shown in FIG. 12, includes circuitry similar to that of FIG. 13, except that no backwards compatibility bit is included or checked.

FIG. 14 shows a state diagram of an alternate circuit for establishing superframe synch. The circuit corresponding to the state diagram of FIG. 14 uses a superframe pattern of "0000010100110111," which will stay synched with up to 8 errors and will establish resynch in a minimum of five frames. The circuit of FIG. 14 reads in the next four frames in the high-speed data input stream and checks the four superframe synchronization bits of these four frames against each of a plurality of four-bit superframe synchronization patterns (each of these four-bit patterns is shown in the Figure). If, for example, the four-bit pattern is "1001", it will match bit pattern 1401 of the Figure, which indicates that the frame has just received frame number 11 (see element 1402) and that the next frame will be frame 12. Thus, the receiving system has reestablished synch at frame 12. In a preferred embodiment of the present invention, the receiving system may also check the synchronization bits in some additional number of input frames, such as 16, to confirm that synch has been reestablished.

In summary, the present invention uses a new method of superframe synch detection. Specifically, the receiving system determines that synch has been lost when it detects six superframe synchronization bit errors in a superframe. Synch is considered regained when the receiver detects twenty consecutive correct synch bits. Error correction is further enhanced and simplified by increasing the number of bits in a justification control flag. Alternate embodiments have either five or seven justification control bits. Even though the number of justification control bits has been enhanced, systems in accordance with the present invention can inter-operate with older systems, since the present invention includes a backward compatibility flag that indicates which justification control flag format is being used.

While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for determining a loss of synchronization in a plurality of frames in a superframe, comprising the steps, performed by a high speed data receiver, of:
   receiving the plurality of frames, each frame having a respective bit of a plurality of superframe synchronization bits;
   comparing the received superframe synchronization bits to a predefined superframe synchronization pattern, where the superframe synchronization pattern has a low cross-correlation and is determined so that a loss of synchronization will always cause at least six errors; and
   determining, if there are at least six errors in the received superframe synchronization bits, that the superframe has lost synchronization.

2. The method of claim 1, wherein the superframe synchronization pattern is "1001100110000111".

3. A method of regaining synchronization of a plurality of frames in a superframe after synchronization has been lost, comprising the steps, performed by a high speed data receiver, of:
   receiving a plurality of frames, each frame having a respective bit of a plurality of superframe synchronization bits;
   comparing the received superframe synchronization bits to a predefined superframe synchronization pattern, said synchronization pattern having a low cross-correlation; and
   determining, if the received superframe synchronization bits are equal to at least a first number of consecutive bits of the predefined superframe synchronization pattern, that the superframe has regained synchronization.

4. The method of claim 3, wherein the superframe synchronization pattern is "1001100110000111".

5. The method of claim 3, wherein the first number is equal to 20.

6. A method of determining whether a stuff opportunity in a frame contains valid data, comprising the steps, performed by a high speed data receiver of:
   receiving a high speed data stream from a sending system, including seven justification control bits and a backwards compatibility flag;
   base on a value of the backwards compatibility flag, determining a majority value of the seven justification control bits or a majority value of a subset of the seven justification control bits; and
   determining, depending on the value of the backwards compatibility flag and if the majority value of the seven justification control bits or the subset of the seven justification control bit is active, that a stuff opportunity contains valid data.

7. The method of claim 6, further comprising the step of:
   delivering the stuff opportunity bit to one of a plurality of tributaries as valid data.

8. A method of synchronizing a plurality of frames in a superframe, comprising the steps, performed by a high speed data receiver, of:
   receiving a high speed data stream, including at least five justification control bits and superframe synchronization bits;
   comparing the received superframe synchronization bits to a predefined superframe synchronization pattern;

determining, if there are at least six errors in the received superframe synchronization bits, that the superframe has lost synchronization; and determining, if there are not at least six errors in the received superframe synchronization bits that the superframe has not lost synchronization, and performing the substeps of:
  determining a majority value of the justification control bits,
  determining, if the majority value of the justification control bits is set that a stuff opportunity bit of the frame contains valid data, and
  delivering the stuff opportunity bit to one of a plurality of tributaries as valid data.

9. The method of claim 8, wherein the superframe synchronization pattern is "1001100110000111".

10. A method of monitoring synchronization in a plurality of frames in a superframe, comprising:
  steps, performed by a high speed data receiver, of:
    receiving the plurality of frames, each frame having a respective bit of a plurality of superframe synchronization bits that establish a synchronization pattern;
    comparing the synchronization pattern of the received superframe synchronization bits to a predefined superframe synchronization pattern, the predefined superframe synchronization pattern being set to cause at least six errors for any superframe synchronization bits misalignment;
    determining whether, when a pattern mismatch is established, the number of errors in the received superframe synchronization bits equals to or exceeds six, a loss-of-synch signal being asserted when the number of errors equals or exceeds six indicating a loss of synchronization; and
    determining whether, when a pattern match is established, a count of consecutive superframe synchronization bits that match the predefined superframe synchronization pattern equals to or exceeds twenty, a synch-restore signal being asserted when the count of consecutive superframe synchronization bits that match equals to or exceeds twenty indicating a re-synchronization.

* * * * *